United States Patent
Kubo et al.

(10) Patent No.: US 9,188,720 B2
(45) Date of Patent: Nov. 17, 2015

(54) INFRARED CUT FILTER AND IMAGING APPARATUS

(71) Applicant: Nippon Sheet Glass Company, Limited, Minato-ku, Tokyo (JP)

(72) Inventors: Yuichiro Kubo, Minato-ku (JP); Mitsuhiro Kawazu, Minato-ku (JP); Katsuhide Shimmo, Minato-ku (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 0 days.

(21) Appl. No.: 14/247,740

(22) Filed: Apr. 8, 2014

(65) Prior Publication Data

US 2014/0300956 A1    Oct. 9, 2014

(30) Foreign Application Priority Data

Apr. 9, 2013  (JP) ................ 2013-081545

(51) Int. Cl.
*G02B 5/28*  (2006.01)
*G02B 5/20*  (2006.01)
*G02B 5/22*  (2006.01)

(52) U.S. Cl.
CPC ............ *G02B 5/282* (2013.01); *G02B 5/208* (2013.01); *G02B 5/223* (2013.01)

(58) Field of Classification Search
CPC ........ G02B 5/208; G02B 5/282; G02B 5/223; G02B 1/10
USPC ......... 359/350, 355, 356, 359–361, 885, 888, 359/890, 892, 839; 396/275
See application file for complete search history.

(56) References Cited

U.S. PATENT DOCUMENTS

| | | | |
|---|---|---|---|
| 6,107,360 A * | 8/2000 | Kaneko et al. | 522/81 |
| 2004/0114114 A1* | 6/2004 | Yano et al. | 353/84 |
| 2007/0146887 A1* | 6/2007 | Ikeda et al. | 359/586 |
| 2010/0210772 A1* | 8/2010 | Hiwatashi | 524/407 |
| 2013/0094075 A1* | 4/2013 | Saitoh et al. | 359/350 |

FOREIGN PATENT DOCUMENTS

JP   2005-338395 A    12/2005
WO   WO 2011158635 A1 * 12/2011

* cited by examiner

*Primary Examiner* — Scott J Sugarman
*Assistant Examiner* — Wen Huang
(74) *Attorney, Agent, or Firm* — Sughrue Mion, PLLC

(57) ABSTRACT

An infrared cut filter includes: a transparent dielectric substrate; an infrared reflecting layer formed on one surface of the transparent dielectric substrate and configured to reflect infrared light; and an infrared absorbing layer formed on the other surface of the transparent dielectric substrate and configured to absorb infrared light. The infrared absorbing layer is formed by encapsulating infrared absorbing pigment in a matrix containing silica, formed by a sol-gel method, as a main component.

13 Claims, 31 Drawing Sheets

FIG.1

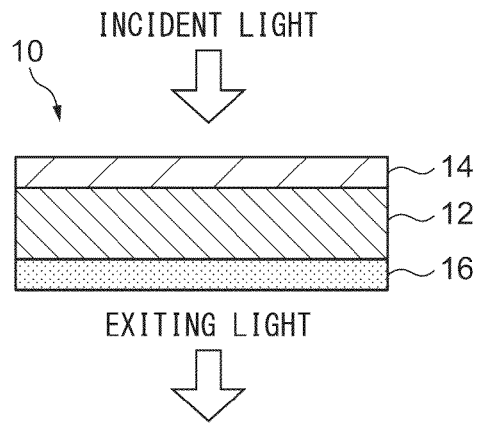

FIG.2

| SOL-GEL MATERIAL | PIGMENT | AMOUNT OF PIGMENT (wt%) | FILM THICKNESS (μm) | APPROPRIATENESS OF PIGMENT ENCAPSULATION |
|---|---|---|---|---|
| TETRAETHOXYSILANE AND METHYLTRIETHOXYSILANE (MIXING RATIO = 20 : 80) | PHTHALOCYANINE-BASED PIGMENT (IR915 FROM NIPPON SHOKUBAI CO., LTD.) | 0.5 | 2.9 | ○ |
| | | 1.2 | 2.5 | ○ |
| | | 2.4 | NOT AVAILABLE | × (AGGLU-TINATATION) |
| | CYANINE-BASED PIGMENT (CY40MC FROM NIPPON KAYAKU CO., LTD.) | 1.1 | 2.5 | ○ |
| | | 1.9 | NOT AVAILABLE | × (AGGLU-TINATATION) |
| TETRAETHOXYSILANE AND PHENYLTRIETHOXYSILANE (MIXING RATIO = 50 : 50) | PHTHALOCYANINE-BASED PIGMENT (IR915 FROM NIPPON SHOKUBAI CO., LTD.) | 2.0 | 2.8 | ○ |
| | | 4.3 | 2.1 | ○ |
| | | 7.2 | 1.5 | ○ |
| | | 10.7 | 1.2 | ○ |
| | | 15.3 | 0.8 | ○ |
| | CYANINE-BASED PIGMENT (CY40MC FROM NIPPON KAYAKU CO., LTD.) | 3.5 | 1.5 | ○ |
| | | 7.8 | 0.8 | ○ |
| | | 12.6 | 0.5 | ○ |

|  |  | WATER/Si RATIO (MOLAR RATIO) | | | |
|---|---|---|---|---|---|
|  |  | 2 | 4 | 6 | 8 |
| RATIO OF MIXING PHENYLTRIETHOXYSILANE AND TETRAETHOXYSILANE (MOLAR RATIO) | 85:15 | × | × | × | × |
| | 80:20 | × | × | ○ | ○ |
| | 75:25 | × | × | ○ | ○ |
| | 70:30 | × | × | ○ | ○ |
| | 65:35 | × | × | ○ | ○ |
| | 50:50 | × | ○ | ○ | ○ |
| | 40:60 | × | × | × | × |

FIG.7

|  | PIGMENT | PIGMENT ATTRIBUTE | AMOUNT ADDED (g) | SOLVENT (g) | SOL-GEL MATERIAL (g) |
|---|---|---|---|---|---|
| FIRST EXEMPLARY EMBODIMENT | CY-10 | CYANINE-BASED COMPOUND | 0.03 | 3.315 | 2.24 |
|  | NIA-7200H | AZO-BASED COMPOUND | 0.015 |  |  |
|  | IRG-022 | DIIMONIUM-BASED COMPOUND | 0.045 |  |  |
| SECOND EXEMPLARY EMBODIMENT | SEPc-6 | PHTHALOCYANINE COPPER COMPLEX | 0.02 | 2.21 | 1.49 |
|  | CY40MC | CYANINE-BASED COMPOUND | 0.04 |  |  |
|  | CIR-RL | DIIMONIUM-BASED COMPOUND | 0.03 |  |  |
| THIRD EXEMPLARY EMBODIMENT | SEPc-6 | PHTHALOCYANINE COPPER COMPLEX | 0.02 | 1.105 | 0.75 |
|  | YND-038 | CONJUGATED HETEROCYCLES | 0.01 |  |  |
|  | IRG-022 | DIIMONIUM-BASED COMPOUND | 0.015 |  |  |

FIG.8

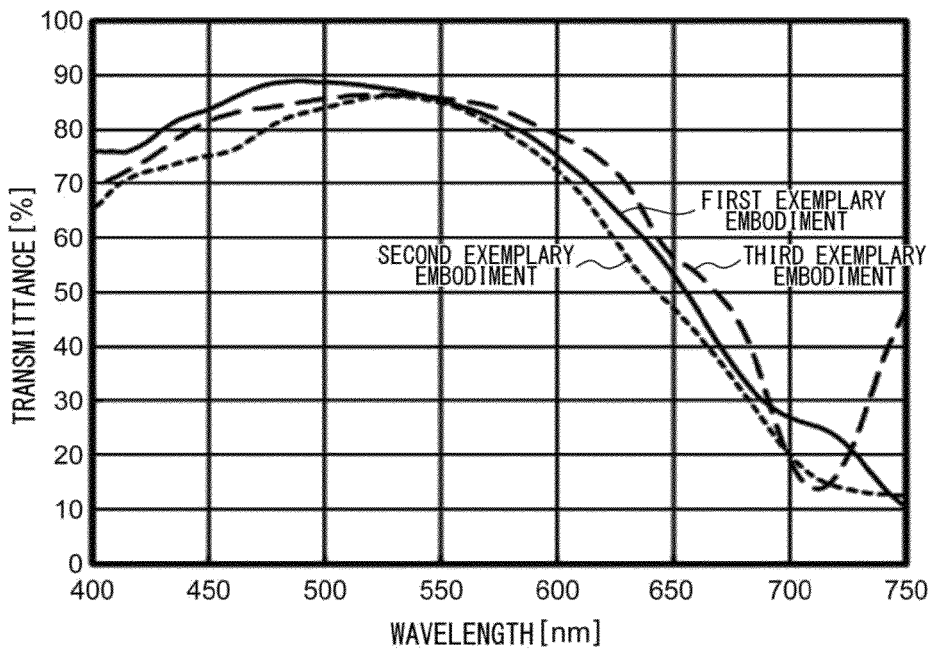

FIG.12

FIRST EXEMPLARY EMBODIMENT

| | 60 | 50 | 40 | 30 | 20 | 10 | 0 | -10 | -20 | -30 | -40 | -50 | -60 |
|---|---|---|---|---|---|---|---|---|---|---|---|---|---|
| $\lambda_{AT50\%} - \lambda_{RT50\%}$ [nm] | | | | | | | | | | | | | |
| $T_{ave}$ [%]($\lambda$=400-600nm) | 77.2 | 79.1 | 79.4 | 79.4 | 79.5 | 79.4 | 79.3 | 79.3 | 79.2 | 79.2 | 79.2 | 79.1 | 79.0 |
| $\lambda_{T2\%}$ [nm] | 620.5 | 630.0 | 639.4 | 648.7 | 657.8 | 666.8 | 675.7 | 684.6 | 693.7 | 703.2 | 712.8 | 711.4 | 730.4 |
| $\lambda_{T5\%}$ [nm] | 613.6 | 627.6 | 632.6 | 642.0 | 651.2 | 660.2 | 668.9 | 677.4 | 685.9 | 694.8 | 704.0 | 713.4 | 722.3 |
| $\lambda_{T50\%}$ [nm] | 592.2 | 601.7 | 611.2 | 620.5 | 629.6 | 638.5 | 646.5 | 649.7 | 649.3 | 649.6 | 651.3 | 651.5 | 651.5 |
| $\lambda_{SLOPE} = \|\lambda_{T50\%} - \lambda_{T2\%}\|$ [nm] | 28.4 | 28.2 | 28.2 | 28.2 | 28.2 | 28.3 | 29.2 | 34.8 | 44.4 | 53.6 | 61.5 | 69.8 | 78.8 |
| $\Delta\lambda_{T50\%}$ [nm] | 30.4 | 30.3 | 30.2 | 30.1 | 29.9 | 29.8 | 29.1 | 24.0 | 15.8 | 8.9 | 4.5 | 1.5 | 1.8 |

FIG.13

SECOND EXEMPLARY EMBODIMENT

| | 60 | 50 | 40 | 30 | 20 | 10 | 0 | -10 | -20 | -30 | -40 | -50 | -60 |
|---|---|---|---|---|---|---|---|---|---|---|---|---|---|
| $\lambda_{AT50\%} - \lambda_{RT50\%}$ [nm] | 69.4 | 72.5 | 74.6 | 75.1 | 75.1 | 75.1 | 75.1 | 75.1 | 75.1 | 75.0 | 75.0 | 75.0 | 75.0 |
| $T_{ave}$ [%]($\lambda$=400-600nm) | 595.8 | 618.0 | 627.3 | 636.5 | 645.9 | 655.2 | 664.4 | 663.6 | 682.2 | 690.8 | 699.0 | 707.3 | 715.9 |
| $\lambda_{T2\%}$ [nm] | 601.8 | 599.3 | 620.6 | 629.8 | 639.1 | 568.0 | 657.5 | 666.4 | 675.0 | 683.3 | 691.3 | 699.2 | 702.6 |
| $\lambda_{T50\%}$ [nm] | 580.3 | 589.9 | 599.4 | 608.8 | 617.8 | 626.3 | 633.6 | 635.5 | 634.0 | 636.0 | 637.3 | 637.9 | 637.8 |
| $\lambda_{SLOPE} = |\lambda_{T50\%} - \lambda_{T2\%}|$ [nm] | 28.4 | 28.1 | 27.9 | 27.8 | 28.1 | 28.9 | 30.8 | 37.9 | 48.2 | 54.8 | 61.7 | 69.4 | 78.2 |
| $\Delta \lambda_{T50\%}$ [nm] | 30.4 | 30.3 | 30.2 | 30.1 | 29.7 | 29.1 | 27.7 | 21.3 | 12.4 | 7.9 | 3.9 | 2.5 | 1.7 |

FIG.14

THIRD EXEMPLARY EMBODIMENT

| | 60 | 50 | 40 | 30 | 20 | 10 | 0 | -10 | -20 | -30 | -40 | -50 | -60 |
|---|---|---|---|---|---|---|---|---|---|---|---|---|---|
| $\lambda_{AT50\%}-\lambda_{RT50\%}$ [nm] | 77.8 | 77.9 | 78.0 | 78.0 | 78.0 | 77.8 | 77.8 | 77.8 | 77.8 | 77.8 | 77.8 | 77.8 | 77.8 |
| $T_{ave}$ [%]($\lambda$=400-600nm) | 632.6 | 641.7 | 651.0 | 660.6 | 669.9 | 679.0 | 687.3 | 694.6 | 701.5 | 709.3 | 721.5 | 737.2 | 749.6 |
| $\lambda_{T2\%}$ [nm] | 625.8 | 635.2 | 644.3 | 653.7 | 663.2 | 672.4 | 681.1 | 688.6 | 695.0 | 701.6 | 709.5 | 721.6 | 740.1 |
| $\lambda_{T5\%}$ [nm] | 604.2 | 613.9 | 623.5 | 632.6 | 641.1 | 649.3 | 657.7 | 660.3 | 658.6 | 660.6 | 662.5 | 663.0 | 663.0 |
| $\lambda_{T50\%}$ [nm] | 28.4 | 27.8 | 27.6 | 28.0 | 28.8 | 29.8 | 29.6 | 34.3 | 43.0 | 48.7 | 59.0 | 69.7 | 82.8 |
| $\lambda_{SLOPE}=|\lambda_{T50\%}-\lambda_{T2\%}|$ [nm] | 30.5 | 30.5 | 30.5 | 30.1 | 29.1 | 28.9 | 28.7 | 22.9 | 14.7 | 10.5 | 5.1 | 2.6 | 2.1 |
| $\Delta\lambda_{T50\%}$ [nm] | | | | | | | | | | | | | | ized
INFRARED CUT FILTER AND IMAGING APPARATUS

BACKGROUND OF THE INVENTION

1. Field of the Invention

The present invention relates to an infrared cut filter and an imaging apparatus in which an infrared cut filter is used.

2. Description of the Related Art

A semiconductor solid-state imaging device such as a charge coupled device (CCD) or a complementary metal oxide semiconductor (CMOS) is built in imaging apparatus such as digital cameras. The sensitivity of these solid-state imaging devices extends from a visible spectrum range to an infrared spectrum range. For this reason, an infrared cut filter for shielding infrared light is provided between an imaging lens system and a solid-state imaging device in the imaging apparatus. The infrared cut filter enables calibrating the sensitivity of the solid-state imaging device to approximate the spectral sensitivity of human beings.

Infrared cut filters used in the related art include those manufactured by forming an infrared reflecting layer including a dielectric multilayer film on a resin substrate (see, for example, patent document 1).

[patent document 1] JP2005-338395

However, an infrared reflecting layer including a dielectric multilayer has incident angle dependence in which infrared shielding property varies depending on the incident angle. Therefore, the central part of an image capturing light transmitted through the infrared reflecting layer may look different in color from the periphery thereof.

Also, an infrared cut filter is required to have high abrasion resistance and environmental resistance because it is provided in front of a solid-state imaging device.

SUMMARY OF THE INVENTION

The present invention addresses the issue and a purpose thereof is to provide an infrared cut filter having favorable infrared shielding property relatively less dependent on the incident angle and having high abrasion resistance and environmental resistance, and to provide an imaging apparatus in which the infrared cut filter is used.

The infrared cut filter according to at least one embodiment comprises: a transparent dielectric substrate; an infrared reflecting layer formed on one surface of the transparent dielectric substrate and configured to reflect infrared light; and an infrared absorbing layer formed on the other surface of the transparent dielectric substrate and configured to absorb infrared light, and formed by encapsulating infrared absorbing pigment in a matrix formed by a sol-gel method to contain silica as a main component.

The infrared reflecting layer may be formed of a dielectric multilayer film.

Given that the wavelength that provides the transmittance of 50% of the infrared reflecting layer is $\lambda_{RT50\%}$ nm and the wavelength that provides the transmittance of 50% of the infrared absorbing layer is $\lambda_{AT50\%}$ nm, the infrared reflecting layer and the infrared absorbing layer may be formed such that $\lambda_{AT50\%} < \lambda_{RT50\%}$ is met.

The infrared reflecting layer and the infrared absorbing layer may be formed such that $\lambda_{AT50\%} - \lambda_{RT50\%} \leq -10$ nm is met.

The infrared reflecting layer and the infrared absorbing layer may be formed such that $\lambda_{AT50\%} - \lambda_{RT50\%} \leq -20$ nm is met.

The infrared reflecting layer and the infrared absorbing layer may be formed such that $\lambda_{AT50\%} - \lambda_{RT50\%} \leq -30$ nm is met.

The infrared reflecting layer and the infrared absorbing layer may be formed such that $-50$ nm $\leq \lambda_{AT50\%} - \lambda_{RT50\%}$ is met.

The infrared absorbing layer may include, as a source material, a mixture of phenyltriethoxysilane and tetraethoxysilane mixed at a ratio between 50:50 and 80:20, both inclusive.

The transparent dielectric substrate may be formed of glass. The infrared reflecting layer may be formed so as to reflect ultraviolet light.

A reflection prevention layer for preventing reflection of visible light may be provided on the infrared absorbing layer. The reflection prevention layer may have the function of preventing transmittance of ultraviolet light.

The infrared reflecting layer may be warped such that the surface opposite to the surface on the side of the transparent dielectric substrate is convex.

Another embodiment of the present invention relates to an imaging apparatus. The imaging apparatus comprises: the aforementioned infrared cut filter; and an imaging device on which light transmitted through the infrared cut filter is incident.

Optional combinations of the aforementioned constituting elements, and implementations of the invention in the form of methods, apparatuses, and systems may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 1 is a cross sectional view showing the structure of the infrared cut filter according to the embodiment of the present invention;

FIG. 2 shows solubility of sol-gel materials and pigments;

FIG. 7 lists the composition of the infrared absorbing layer used in the first through third exemplary embodiments;

FIG. 8 shows spectral transmittance curves of infrared cut filters in which only the infrared absorbing layers according to the first through third exemplary embodiments are respectively formed;

FIG. 12 lists primary parameters of the spectral transmittance curves shown in FIGS. 9A-9M;

FIG. 13 lists primary parameters of the spectral transmittance curves shown in FIGS. 10A-10M;

FIG. 14 lists primary parameters of the spectral transmittance curves shown in FIGS. 11A-11M;

DETAILED DESCRIPTION OF THE INVENTION

Figure 3:
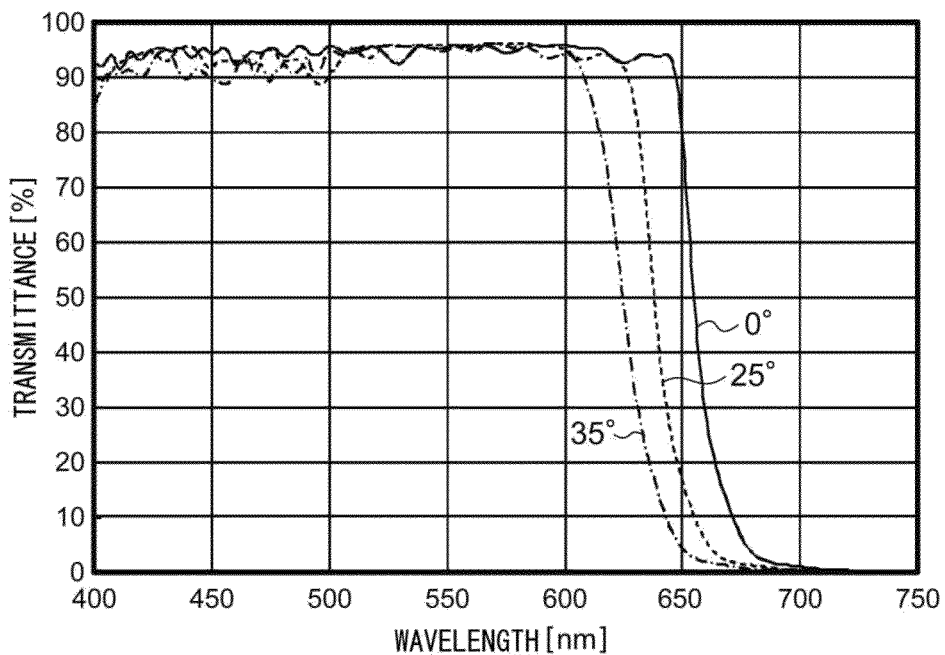
FIG. 3 shows an exemplary spectral transmittance curve of an infrared reflecting layer according to the first comparative example including a dielectric multilayer film.

The invention will now be described by reference to the preferred embodiments. This does not intend to limit the scope of the present invention, but to exemplify the invention.

FIG. 1 is a cross sectional view showing the structure of an infrared cut filter 10 according to an embodiment of the present invention. As shown in FIG. 1, the infrared cut filter 10 includes a transparent dielectric substrate 12, an infrared reflecting layer 14, and an infrared absorbing layer 16. The infrared reflecting layer 14 is formed on one of the surfaces of the transparent dielectric substrate 12. The infrared absorbing layer 16 is formed on the other surface of the transparent dielectric substrate 12.

For example, the infrared cut filter 10 shown in FIG. 1 is provided between the imaging lens system and the imaging device of a digital camera. The infrared cut filter 10 is implemented to receive light via the infrared reflecting layer 14 and emit light from the infrared absorbing layer 16. In other words, the infrared reflecting layer 14 as implemented in the camera faces the imaging lens system and the infrared absorbing layer 16 faces the imaging device.

The transparent dielectric substrate 12 may be a plate of a thickness of about 0.1 mm-0.3 mm. The material forming the transparent dielectric substrate 12 is non-limiting so long as it transmits visible light. For example, the transparent dielectric substrate 12 may be formed of glass. A glass substrate formed of glass is inexpensive and so is favorable in terms of cost. Alternatively, a synthetic resin film or a synthetic resin substrate formed of polymethylmethacrylate (PMMA), polyethylene terephthalate (PET), polycarbonate (PC), polyimide (PI), etc. may be used as the transparent dielectric substrate 12.

The infrared reflecting layer 14 is formed on one of the surfaces of the transparent dielectric substrate 12 as described above and functions as a surface on which light is incident. The infrared reflecting layer 14 is configured to transmit visible light and reflect infrared light. The infrared reflecting layer 14 may be formed of a dielectric multilayer film including a stack of a plurality of dielectric layers with different refractive indices. The optical property of the dielectric multilayer film such as spectral transmittance property can be designed at will by controlling the refractive index and thickness of each layer. The infrared reflecting layer 14 may be formed by alternately depositing a titanium oxide ($TiO_2$) layer and silicon oxide ($SiO_2$) layer with different refractive indices on the transparent dielectric substrate 12. Other than $TiO_2$ and $SiO_2$, a dielectric material such as $MgF_2$, $Al_2O_3$, $MgO$, $ZrO_2$, $Nb_2O_5$, and $Ta_2O_5$ may be used to form the dielectric multilayer film.

The infrared absorbing layer 16 is formed on the other surface of the transparent dielectric substrate 12 as described above and functions as a surface from which light exits. The infrared absorbing layer 16 is configured to transmit visible light and absorb infrared light. The light incident on the infrared cut filter 10 is transmitted through the infrared reflecting layer 14 and the transparent dielectric substrate 12 before being incident on the infrared absorbing layer 16. Therefore, the infrared absorbing layer 16 absorbs infrared light not shielded by the infrared reflecting layer 14 or the transparent dielectric substrate 12.

The infrared absorbing layer 16 of the infrared cut filter according to this embodiment includes infrared absorbing pigment and a matrix formed by the sol-gel method to contain silica as a main component. Infrared absorbing films commonly used in the related art are produced by encapsulating infrared absorbing pigment containing an organic compound such as a phthalocyanine compound, a cyanine compound, a diimonium compound in a resin matrix made of a transparent dielectric material such as polyester, polyacryl, polyolefin, polyvinyl butyral, and polycarbonate. However, an organic resin matrix lacks sufficient hardness or abrasion resistance due to its property. In actual use, it has been necessary to build a protective layer such as a hard coat on the top surface of the resin matrix.

To address this problem in the infrared cut filter 10 according to this embodiment, the infrared absorbing layer 16 is configured by employing a matrix formed by the sol-gel method to contain silica as a main component. Advantages from employing the infrared absorbing layer 16 formed by the sol-gel method to contain silica as a main component will be discussed below.

The first advantage is that the infrared absorbing layer 16 with high hardness is obtained. An ordinary means to encapsulate infrared absorbing pigment containing an organic compound such as a phthalocyanine compound, a cyanine compound, a diimonium compound is to use a binder containing an organic matrix for encapsulation. However, an organic matrix lacks sufficient hardness or abrasion resistance due to its property. In actual use, it has been necessary to build a protective layer such as a hard coat on the top surface of the matrix.

The infrared absorbing layer 16 according to this embodiment is formed by an organic-inorganic hybrid layer of matrix containing silica as a main component. Therefore, there is no problem with hardness in technical fields to which the layer is applied. Aside from its favorable physical property, the inventive layer provides an advantage of reduced manufacturing cost because there is substantially no need for hard coating, etc. for protection.

Secondly, environmental resistance is improved. Because the infrared absorbing layer 16 is formed by a matrix containing silica as a main component, the infrared absorbing layer 16 provides better barrier against humidity as compared with a related-art infrared absorbing film formed by an organic binder. It is expected that the inventive infrared absorbing layer 16 provides an advantage of reducing adverse impact from the environment on the encapsulated infrared absorbing pigment including an organic compound.

Thirdly, the inventive infrared absorbing layer 16 provides better adhesion to a substrate made of glass, etc. In the process of coating a glass (i.e., inorganic) substrate with an infrared absorbing film formed by a resin-based binder commonly used in the related art, a priming step of pre-coating the glass substrate with a silane coupling agent is necessary. Absence of such a step may result in a problem in that the infrared absorbing film may be exfoliated from the glass substrate under a certain severe environment. Since the infrared absorbing layer 16 according to this embodiment is formed by a matrix containing, as a main component, silica, which has affinity for glass, it is expected that adhesion to the glass substrate is improved.

A description will now be given of a material necessary to form a silica-based film formed by the sol-gel method and an advantage of such a material.

The source material for silica will be described. In the infrared cut filter 10 according to this embodiment, tetraethoxysilane (TEOS/chemical formula $Si(OC_2H_5)_4$)) is used as a main component of source materials for the infrared absorbing layer 16 and the matrix of the infrared absorbing layer 16 is formed by the sol-gel method. Tetraethoxysilane is a kind of alkoxysilane ($SiR_{4-m}(OC_nH_{2n+1})_m$) described later (R denotes a functional group and m denotes an integer between 0 and 4).

Generally, glass is manufactured by a melting method in which a source material is melted at a high temperature beyond 1500° C. and then cooled. By way of contrast, the sol-gel method is a relatively new method of manufacturing glass or ceramics at a low temperature. The sol-gel method uses a solution of an inorganic or organic metal compound as a starting material. Hydrolysis or polycondensation of compounds in the solution turns the solution into a sol in which fine particles of metal oxides or hydroxides are dissolved. The reaction is allowed to proceed until the sol is solidified into a gel. The gel is heated to obtain a solid oxide. The sol-gel method produces glass from a solution and so is capable of forming a thin film on a variety of substrates. The sol-gel method is characterized by its capability to manufacture glass at a temperature lower than the temperature of manufacturing glass by the melting method.

A description will be given of a sol-gel process. Formation of a silica-based film formed by the sol-gel method will be described by way of example. In the sol-gel method that uses alkoxysilane as a starting material, for example, alkoxysilane is subject to hydrolysis and dehydration condensation in the solution in the presence of water and a catalyst. As a result, a sol formed by an oligomer having a siloxane bond is formed. When the sol solution is applied on a substrate, etc., water and the solvent vaporize from the solution. This condenses oligomer and increases its molecular weight so that fluidity is lost and the sol is turned into a gel. Immediately after the gel is formed, gaps in the network remain filled with the solvent or water. As the gel is dried and water and the solvent vaporize, the siloxane polymer further shrinks and the gel is solidified.

Generally, hydrolysis of alcoxysilane and water is represented as follows. Taking tetraethoxysilane as an example:

$$n^*Si(OC_2H_5)_4 + 4n^*H_2O \rightarrow n^*Si(OH)_4 + 4n^*C_2H_5OH$$
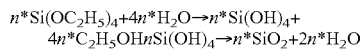
$$n^*Si(OH)_4 \rightarrow n^*SiO_2 + 2n^*H_2O$$

In other words, stoichiometrically, all alkoxy groups ($-O-C_nH_{2n+1}$) are hydrolyzed given there are 4 moles or more of water for one mole of alcoxysilane.

It should also be noted alkali or acid is usually added as a catalyst.

In many cases, tetraalkoxysilane, which is exemplified by tetraethoxysilane, is used as a starting material of a silica-based film formed by the sol-gel method. By forming a sol-gel film using it as a starting material, four reactive groups form a solid network so that a dense and favorable glassy film is obtained. Other types of tetraalkoxysilane that may be used include tetramethoxysilane, tetra-propoxysilane, tetra-isopropoxysilane, etc. The larger the alkoxy group ($-O-CnH_{2n+1}$) ligated to Si of silane compounds, the lower the speed of hydrolysis. Thus, the number of n may be selected depending on the required property of the end product or the convenience of processes.

In this embodiment, trialkoxysilane containing three functional groups (e.g., phenyltriethoxysilane) is mixed in addition to tetraethoxysilane to produce a source material of a sol-gel film. Tetraethoxysilane, which is employed in the above step is suitably used as a source material of silica forming a sol-gel film. This is because proper glassy appearance and property are obtained by calcination at a relatively low temperature.

In a sol-gel film produced only by using tetraethoxysilane as a source material, tetraethoxysilane is liable to reduce spatial margin in a bridge structure during gelatinization of the film being built. Consequently, cracks are easily created in the film. This will be exhibited significantly when designing the film to have a certain thickness.

In accordance with this embodiment, it is necessary to encapsulate one or more type of infrared absorbing pigment containing an organic compound in the film. This can result in a disadvantage in that a desired amount of pigment cannot be encapsulated in the sol-gel film produced only by using tetraethoxysilane as a source material.

By providing the sol-gel film with certain flexibility, cracks will be less likely to be created. This is addressed by adding trialkoxysilane containing three functional groups to tetraethoxysilane. Trialkoxysilane is a generic term for silane compounds having three alkoxy groups around Si, with the remaining one place being filled by a modifying group including a methyl group, ethyl group, and phenyl group and having a relatively low reactivity. A silica film formed by trialkoxysilane containing three reactive functional groups produces extra space so that stress produced upon gelatinization is relatively small and cracks are less likely to be created. Further, the three reactive functional groups allow one silicon compound to form three solid siloxane bonds and so allows a bridged network to be formed. Dialkoxysilane having two alkoxy groups is also available. However, dialkoxysilane is likely to create a straight chain at the time of condensation polymerization during hydrolysis. Because only a chain network is formed, abrasion resistance of the film is disadvantageously reduced.

Methyltrimethoxysilane, ethyltrimethoxysilane, propyltrimethoxysilane, isopropyltrimethoxysilane, butyltrimethoxysilane, isobutyltrimethoxysilane, phenyltrimethoxysilane, phenyltriethoxysilane, methyltriethoxysilane, phenyltriisopropoxysilane, ethyltriethoxysilane, propyltriethoxysilane, etc. can be used as trialkoxysilane.

Of these, trialkoxysilane having a phenyl group ($-C_6H_5$) as a functional group is suitable. A phenyl group is considered to remain in the film after the sol-gel reaction and produce flexibility in a calcination condition of 100° C. through 200° C.

It has also been found that trialkoxysilane having a phenyl group works advantageously in encapsulating infrared absorbing pigment containing an organic compound. Capability of methyltriethoxysilane and phenyltriethoxysilane (PhTEOS/chemical formula=$Si(C_6H_5)(C_2H_5O)_3$), which are examples of trialkoxysilane, of encapsulating pigment was examined. Details will be described below. In the case of methyltriethoxysilane, the pigment agglutinated after the sol-gel reaction resulting in a failure to form a uniform, transparent silica-based film. On the other hand, we found that phenyltriethoxysilane is capable of encapsulating infrared absorbing pigment sufficiently. This could be because a large amount of infrared absorbing pigment containing an organic compound can be introduced in pores produced in the silica-based film formed by alkoxysilane having a phenyl group. Aside from phenyltriethoxysilane, phenyltrimethoxysilane, phenyltriisopropoxysilane, and phenyl tri-n-propoxysilane exemplify trialkoxysilane containing a phenyl group as a functional group. Trialkoxysilane having a phenyl group and providing the aforementioned advantage (hereinafter, phenyltrialkoxysilane) is mixed with tetraalkoxysilane such as tetraethoxysilane mentioned above so as to produce a source material for a silica film formed by the sol-gel method. This is because excessive amount of phenyltrialkoxysilane or use of phenyltriethoxysilane alone to form a silica film formed by the sol-gel method may result in failure to harden the film due to the flexibility. Even if the film is hardened, an extremely high calcination temperature may be necessary or the mechanical strength of the film may not be satisfactory. It is therefore necessary to mix phenyltrialkoxysilane having three functional groups with tetraalkoxysilane having four functional groups appropriately.

FIG. 2 shows results of experiments of mixing methyltriethoxysilane with tetraethoxysilane and mixing phenyltriethoxysilane with tetraethoxysilane, and encapsulating phthalocyanine-based infrared absorbing pigment and cyanine-based infrared absorbing pigment in the respective mixture.

The results of experiments show that, in the case of using a mixture of tetraethoxysilane and methyltriethoxysilane as a source material, both types of pigment tends to agglutinate and a constraint met in the amount encapsulated is intolerable. Meanwhile, the results show that use of a mixture of tetraethoxysilane and phenyltriethoxysilane as a source material for the sol-gel film ensures that both types of pigment are encapsulated in a sufficient amount and the film thickness can be selected as desired, providing advantageous results in encapsulation of infrared absorbing pigment.

A description will now be given of water. Water is an essential component for hydrolysis of alkoxysilane. As mentioned above, stoichiometrically, 4 moles of water is necessary for one mole of alcoxysilane. Water continues to vaporize during the formation of a silica film formed by the sol-gel method so that it is generally common to make water available in a stoichiometrically required amount or more.

However, excessive amount of water may impede encapsulation in the infrared absorbing film. Infrared absorbing pigment containing an organic compound exhibits relatively low polarity and is hydrophobic. Meanwhile, water exhibits high polarity. Therefore, excessive water impedes dissolution of hydrophobic infrared absorbing pigment in the solvent and encapsulation of the pigment in alcoxysilane.

A description will now be given of the solvent. The solvent is added for the purpose of increasing compatibility among alcoxysilane, water and acid (catalyst). An additional requirement is that the solvent is highly capable of dissolving infrared absorbing pigment containing an organic compound. It is therefore desirable that the solvent exhibit an appropriate polarity.

Further, the solvent need be vaporized at least at a calcination temperature or below in forming a silica film formed by the sol-gel method. Conversely, excessively low boiling point causes abrupt vaporization of the solvent to occur immediately after the coating of the substrate while a silica network is still being formed, resulting in problems in pigment encapsulation. Further, if the boiling point of the solvent is lower than water, water, which has high surface tension, ultimately remains on the silica film in the process of calcination, resulting in problems such as cracks due to abrupt film shrinkage.

Still further, infrared absorbing pigment containing an organic compound is degraded in a high-temperature environment. The resultant absorbing property is quite different from the initial property so that a desired infrared absorbing film cannot be obtained. Therefore, calcination need be performed at a temperature range in which the infrared absorbing pigment is not degraded due to heat. Generally, the temperature that infrared absorbing pigment can withstand varies depending on its property. For example, phthalocyanine-based pigment can withstand 200° C. and cyanine-based pigment can withstand 140-160° C. It is therefore necessary to complete calcination at least at the withstand temperature or below.

Based upon the above consideration, the boiling point required of the solvent is between 100° C. and 200° C., both inclusive, and, more preferably, 100° C.-160° C., both inclusive.

The solvent commonly used is exemplified by methanol, ethanol, propyl alcohol, isopropyl alcohol, acetone, acetonitrile, dimethyl sulfoxide, dimethylformamide, dimethyl imidazolidinone, ethylene glycol, tetraethylene glycol, dimethylacetamide, N-methyl-2-pyrolidone, tetrahydrofuran, dioxane, methyl ethyl ketone, cyclohexanone, cyclopentanone, 2-methoxyethanol (methylcellosolve), 2-ethoxyethanol (ethylcellosolve), ethyl acetate, etc.

In this embodiment, cyclohexanone (boiling point=131° C.) and cyclopentanone (boiling point=156° C.) are suitably used from the perspective of solubility of infrared absorbing pigment and boiling point.

A description will now be given of acid. Acid works as a catalyst in hydrolysis of alcoxysilane. Desirably, the acid used is a strong acid exemplified by hydrochloric acid, nitric acid, trichloroacetic acid, trifluoroacetic acid, sulfuric acid, phosphoric acid, methanesulfonic acid, p-toluenesulfonic acid, oxalic acid, etc.

A description will now be given of the function of the infrared cut filter 10 according to the embodiment. A description will first be given of the function of the infrared cut filter according to comparative examples before describing the function of the infrared cut filter 10 according to this embodiment.

Figure 4:
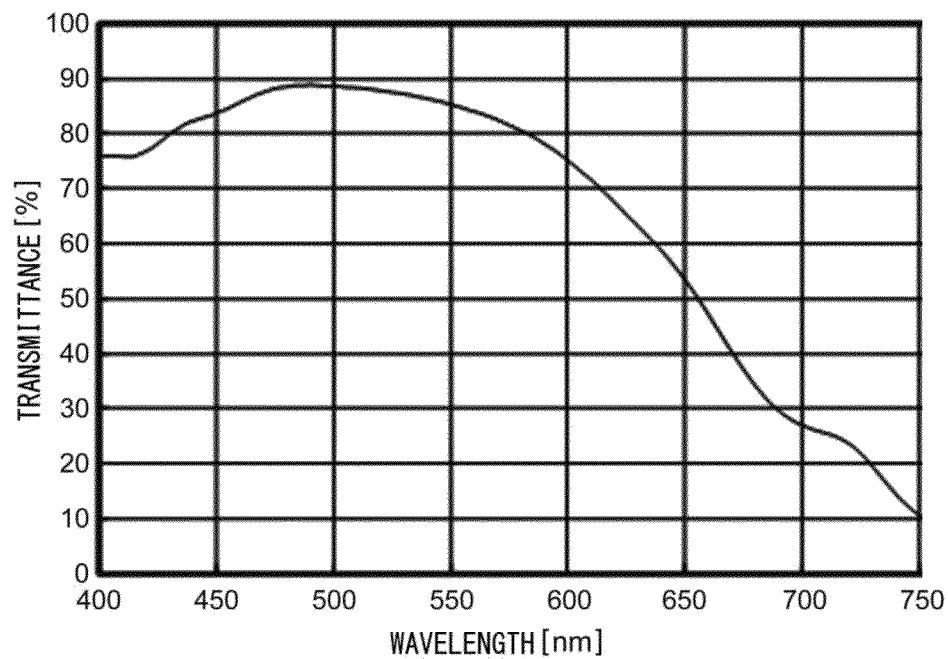
FIG. 4 shows an exemplary spectral transmittance curve of an infrared absorbing layer according to the second comparative example.

FIG. 3 shows an exemplary spectral transmittance curve of an infrared cut filter according to the first comparative example in which only an infrared reflecting layer including a dielectric multilayer film is formed on a glass substrate. FIG. 4 shows an exemplary spectral transmittance curve of an infrared cut filter according to the second comparative example in which only an infrared absorbing layer, including infrared absorbing pigment and a matrix formed by the sol-gel method to contain silica as a main component, is formed.

As shown in FIG. 3, the infrared cut filter according to the first comparative example exhibits dependence on the incident angle, which is characteristic to a dielectric multilayer film. The solid line in FIG. 3 represents the spectral transmittance curve that results when the incident angle is 0°, the broken line represents the spectral transmittance curve that results when the incident angle is 25°, and the chain line represents the spectral transmittance curve that results when the incident angle is 35°. Given that the wavelength that provides the transmittance of 50% is $\lambda_{RT50\%}$, $\lambda_{RT50\%}$=about 655 nm when the incident angle is 0°. When the incident angle is 25°, $\lambda_{RT50\%}$=about 637 nm, and, when the incident angle is 35°, $\lambda_{RT50\%}$=about 625 nm. Thus, when the incident angle changes from 0° to 35° in the infrared cut filter according to the first comparative example, $\lambda_{RT50\%}$ is shifted to the short wavelength side by about 30 nm.

Provided that the infrared cut filter is used with an imaging device, light with a small incident angle (e.g. the incident angle of 0°) on the infrared cut filter enters the central part of the imaging device. Meanwhile, light with a large incident angle (e.g. the incident angle of 25° or 35°) on the infrared cut filter enters the periphery of the imaging device. Therefore, if the infrared cut filter having the infrared shielding property shown in FIG. 3 is used in an imaging apparatus, the spectral transmittance property (in particular, the spectral property near the wavelength 650 nm) of light entering the imaging device will differ depending on the position on the light-receiving surface of the imaging device. This results in different colors in the central part of an image and in the periphery thereof, thereby adversely affecting color reproducibility.

Unlike the infrared cut filter according to the first comparative example, the shielding property of the infrared cut filter according to the second comparative example is not dependent on the incident angle. However, the spectral transmittance curve of the infrared cut filter according to the second comparative example shows gradual decrease in a transient range where the transmittance changes from relatively high to relatively low. Generally, an infrared cut filter is designed to have a transient range near the wavelength of 600 nm to 700 nm so as not to affect color reproducibility. An infrared cut filter is expected show an abrupt change in the transmittance in this range. Such a property is referred to as "sharp cut-off property". Therefore, it is impossible to control color reproducibility properly by using the infrared cut filter according to the second comparative example.

We considered the disadvantage associated with the comparative examples and found out that reduction in the dependence of the shielding property on the incident angle and favorable sharp cut-off property can be realized by forming the infrared reflecting layer 14 on one surface of the transparent dielectric substrate 12 and forming the infrared absorbing layer 16 on the other surface.

Figures 5, 6:
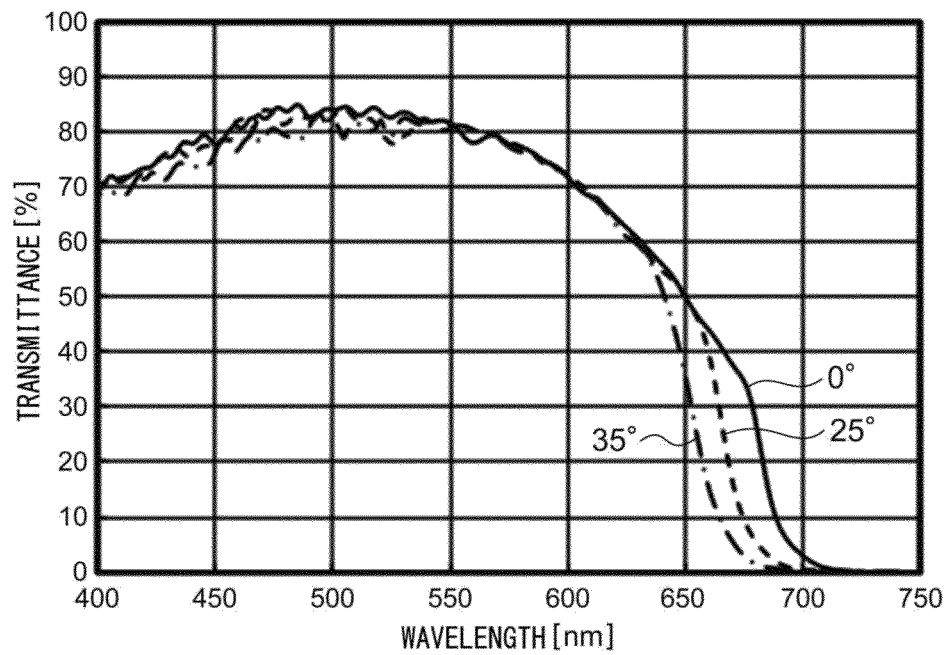
FIG. 5 shows an exemplary spectral transmittance curve of the infrared cut filter according to the embodiment.
FIG. 6 shows results of study made on ratios of mixing phenyltriethoxysilane and tetraethoxysilane and the amount of water required to be added for hydrolysis.

FIG. 5 shows an exemplary spectral transmittance curve of the infrared cut filter 10 according to the embodiment. In FIG. 5, as in FIG. 3, the solid line represents the spectral transmittance curve that results when the incident angle is 0°, the broken line represents the spectral transmittance curve that results when the incident angle is 25°, and the chain line represents the spectral transmittance curve that results when the incident angle is 35°.

The property of the infrared cut filter 10 according to the embodiment is determined by the combination of the optical property of the infrared reflecting layer 14 and the optical property of the infrared absorbing layer 16. It will be given that the wavelength that provides the transmittance of 50% of the infrared reflecting layer alone when the incident angle is 0° is $\lambda_{RT50\%}$ (nm), and the wavelength that provides the transmittance of 50% of the infrared absorbing layer alone is $\lambda_{AT50\%}$ (nm). FIG. 5 shows the spectral transmittance curve of the infrared cut filter 10 in which $\lambda_{AT50\%}=\lambda_{RT50\%}-30$ nm, namely, in which $\lambda_{AT50\%}$ is shorter than $\lambda_{RT50\%}$ by 30 nm.

Given that the wavelength that provides the transmittance of 50% of the infrared cut filter 10 according to the embodiment when the incident angle is 0° is $\lambda_{T50\%}$ (nm), $\lambda_{T50\%}$ of the infrared cut filter 10 according to the embodiment is approximately equal to 650 nm when the incident angle is 0°, as shown in FIG. 5. When the incident angle is 25°, $\lambda_{T50\%}$ is approximately equal to 650 nm. When the incident angle is 35°, $\lambda_{T50\%}$ is approximately equal to 642 nm. Thus, $\lambda_{T50\%}$ of the infrared cut filter 10 according to the embodiment is shifted to the short wavelength side by only about 8 nm even when the incident angle changes from 0° to 35°. The dependence of $\lambda_{T50\%}$ on the incident angle is smaller than the dependence of $\lambda_{RT50\%}$ on the incident angle of the first comparative example. Referring also to FIG. 5, change in the incident angle hardly produces any change in the spectral transmittance curve in the range in which the transmittance is higher than 50%. Meanwhile, in the range in which the transmittance is lower than 50%, the spectral transmittance curve shows a difference in response to a change in the incident angle. However, the difference in the spectral transmittance curve in the range in which the transmittance is lower than 50% hardly presents any problem because the impact on color reproducibility is small.

Further, FIG. 5 shows that the infrared cut filter 10 according to the embodiment has a transient range near the wavelength of 600 nm to 700 nm. The transmittance changes abruptly in this range with the result that a favorable sharp cut-off property is realized.

The optical property of the infrared cut filter 10 according to the embodiment is determined by the combination of the infrared reflecting layer 14 and the infrared absorbing layer 16. The favorable optical property of the infrared reflecting layer 14 and the infrared absorbing layer 16 will now be discussed.

First, the suitable optical property of the infrared reflecting layer 14 will be discussed. The infrared reflecting layer 14 is designed to pass visible light at least in a band of 400 nm-600 nm and at least reflect infrared light with a wavelength longer than 750 nm so as to achieve the required performance. The wavelength that provides the spectral transmittance of 50% in a transient range between the transmission range and the reflection range will be defined as a cut-off wavelength $\lambda_{RT50\%}$. $\lambda_{RT50\%}$ of the infrared reflecting layer 14 depends on the requirement from the spectral sensitivity area of the imaging device and is preferably designed to be near the cut-off wavelength $\lambda_{AT50\%}$ of the infrared absorbing layer 16. More preferably, $\lambda_{RT50\%}$ is designed such that $\lambda_{AT50\%}<\lambda_{RT50\%}$. Desirably, the cut-off wavelength $\lambda_{RT50\%}$ of the infrared reflecting layer 14 is in the range of 630 nm-690 nm.

The infrared reflecting layer 14 is designed so that the transmittance in the visible spectrum range is as high as possible. This is to allow light in the visible spectrum range necessary for imaging to reach the light-receiving surface of the imaging device as much as possible. Meanwhile, the infrared reflecting layer 14 is designed so that the transmittance in the infrared spectrum range is as low as possible. This is to shield light not contributing to imaging or light in a harmful range as much as possible. For example, the infrared reflecting layer 14 preferably has an average spectral transmittance of 90% or greater at least in a visible spectrum range in the wavelength band of 400 nm-600 nm and a spectral transmittance of less than 2% at least in an infrared spectrum range beyond the wavelength of 750 nm.

Further, the spectral transmittance of the infrared reflecting layer 14 preferably exhibits abrupt change in the transient range (referred to as "sharp cut-off property"). This is because, if the sharp cut-off property is lost and the transient range grows excessively, it will be difficult to control color reproducibility. Defining the steepness of the transmittance in the transient range as $\lambda_{RSLOPE}=|\lambda_{RT50\%}-\lambda_{RT2\%}|$ ($\lambda_{RT2\%}$ denotes the wavelength that provides the spectral transmittance of 2%), $\lambda_{RSLOPE}$ of the infrared reflecting layer 14 is preferably as small as possible. For example, $\lambda_{RSLOPE}$ is preferably less than 70 nm.

The spectral transmittance curve shown in FIG. 3 shows that the average spectral transmittance is 90% or greater in the visible spectrum range when the incident angle is 0°, 25°, or 35°. The average spectral transmittance in the infrared spectrum range is less than 2%. The spectral transmittance curve shown in FIG. 3 also shows that $\lambda_{RSLOPE}$ is less than 70 nm when the incident angle is 0°, 25°, or 35°. Therefore, the infrared reflecting layer 14 having the spectral transmittance shown in FIG. 3 can be suitably used in the infrared cut filter 10 according to the embodiment.

A description will now be given of the suitable optical property of the infrared absorbing layer 16. The optical property required of the infrared absorbing layer 16 varies depending on the optical property of the infrared reflecting layer 14 with which the infrared absorbing layer 16 is combined.

In this embodiment, it is preferable that the cut-off wavelength $\lambda_{AT50\%}$ of the infrared absorbing layer 16 be shorter than the cut-off wavelength $\lambda_{RT50\%}$ of the infrared reflecting layer 14, i.e., it is preferable that $\lambda_{AT50\%} < \lambda_{RT50\%}$. By ensuring that the infrared absorbing layer 16 meets this condition, the dependence of the infrared shielding property on the incident angle of the infrared cut filter 10, namely, the shift amount of the cut-off wavelength $\lambda_{T50\%}$ of the infrared cut filter 10 occurring when the incident angle changes from 0° to 35° can be reduced. Desirably, the cut-off wavelength $\lambda_{AT50\%}$ of the infrared absorbing layer 16 is in the range of 630 nm-690 nm.

Further, it is preferable that the average transmittance of the infrared absorbing layer 16 in the visible spectrum range be as high as possible. This is because, if the average transmittance in the range of the infrared absorbing layer 16 is small, the amount of light reaching the imaging device will be small. For example, it is preferable that the average transmittance of the infrared absorbing layer 16 in the wavelength 400 nm-600 nm be 75% or greater.

In this embodiment, the spectral transmittance of the infrared absorbing layer 16 in the long wavelength range beyond $\lambda_{RT2\%}$ is not of concern. This is because the average spectral transmittance of the infrared reflecting layer 14 is extremely small in this range so that the transmittance of the infrared cut filter 10 as a whole is ensured to be low.

In this embodiment, it is preferable that the spectral transmittance curve of the infrared absorbing layer 16 monotonously decrease in the transient range (e.g. 600 nm-$\lambda_{RT2\%}$). This is because it is easy in this way to know the cut-off wavelength $\lambda_{T50\%}$ of the infrared cut filter 10 comprised of the combination of the layers 14 and 16. Other advantages include easiness and flexibility of setting and easiness of control of color reproducibility.

Discussed below are first through third exemplary embodiments of the infrared cut filter in which are used the infrared reflecting layer and the infrared absorbing layer that meet all of the above conditions. Also, a detailed study is made of the relationship between the cut-off wavelength $\lambda_{RT50\%}$ of the infrared reflecting layer 14 and the cut-off wavelength $\lambda_{AT50\%}$ of the infrared absorbing layer 16.

First, a description will be given of an appropriate ratio of mixing phenyltriethoxysilane and tetraethoxysilane. FIG. 6 shows results of study made on ratios of mixing phenyltriethoxysilane and tetraethoxysilane and the amount of water required to be added for hydrolysis (water/Si ratio).

In the table shown in FIG. 6, circles represent ratios at which the pigment used in the first through third exemplary embodiments (described later) can be encapsulated and which pass a test for mechanical strength. Crosses represent the other ratios. Tests for mechanical strength include (a) whether the film as formed does not peel even if it is wiped by a soft paper wiper imbued with ethanol, (b) the film is not dislocated by, for example, exfoliation, when a predefined tape pasted on the film with checkerboard incision is peeled off.

The table shown in FIG. 6 reveals that the ratio of mixing phenyltriethoxysilane and tetraethoxysilane is preferably in the range between 50:50 and 80:20 and that the amount of water that should be added is 4 moles or more and, preferably, 6-8 moles, for one mole of Si.

The table shown in FIG. 6 reveals that, if the ratio of mixing phenyltriethoxysilane and tetraethoxysilane is 40:60 or below, pigment added in a predefined amount agglutinates and cannot be encapsulated.

FIG. 7 lists the composition of the infrared absorbing layer 16 used in the first through third exemplary embodiments. Referring to FIG. 7, CY-10, IRG-022 are from NIPPON KAYAKU CO., LTD., NIA-7200H is from HAKKOL CHEMICAL CO., LTD., SEPc-6 is from YAMADA CHEMICAL CO., LTD., and CIR-RL is from JAPAN CARLIT CO., LTD. In accordance with the result shown in FIG. 6, phenyltriethoxysilane and tetraethoxysilane mixed at a ratio 50:50 is used as a source material of the sol-gel film. Cyclopentanone was used as a solvent consistently. Hydrochloric acid (1 mole/liter) was used as an acid catalyst. 6 moles of water was administered per 1 mole of Si. In order to obtain a desired spectral property of the infrared absorbing film, three groups of pigment shown in FIG. 7 were administered so as to practice first through third exemplary embodiments.

The infrared absorbing layer 16 according to the exemplary embodiments was formed in the following steps. First, the sol-gel source material, water, hydrochloric acid (acid catalyst) in an amount of about 1/10 wt % with respect to water are put in an appropriate container. The mixture is churned for about 4 hours at room temperature so as to obtain a sol. Pigment in a predetermined measured amount is then administered to the solvent of cyclopentanone. The solution is churned for about 20 minutes at room temperature. The resultant solution is mixed with the sol.

The infrared reflecting layer 14 according to the exemplary embodiments was formed in the following steps. The infrared reflecting layer 14 including a dielectric multilayer film and having, for example, the spectral transmittance curve shown in FIG. 3 is formed on one, cleaned surface of D263 glass (76 through 90 mm²×t=around 0.1-0.2 mm) from SCHOTT AG, which embodies the transparent dielectric substrate 12, using the ion plating method, sputtering method, or vapor deposition method. One or a plurality of substances selected from the group $SiO_2$, $TiO_2$, $Ta_2O_3$, $MgF_2$, etc. may be used as the dielectric material used.

Formation of the infrared reflecting layer 14 including a dielectric multilayer film according to one of the methods mentioned above need be performed prior to the formation of the infrared absorbing layer 16 described later. In these methods of forming a multilayer film, the transparent dielectric substrate 12 is exposed to vacuum and high temperature (around 100° C.-200° C.) in the process. If the infrared reflecting layer 14 is formed after the infrared absorbing layer 16 is formed, the infrared absorbing pigment may be degraded.

The surface of the transparent dielectric substrate 12 not formed with the infrared reflecting layer 14 is cleaned according to a predetermined procedure and then coated with a sol containing infrared absorbing pigment. The surface is coated by spin coating performed at a speed of about 500 rpm and in a room temperature environment.

The transparent dielectric substrate 12 coated with a sol is heated at 140° C. in an oven for 20 minutes. This substrate is heated for the purpose of promoting sol-gel reaction induced by hydrolysis and vaporizing excess water, solvent, etc. The surface of the infrared absorbing layer 16 thus formed is glassy and hard and so is suitable.

FIG. 8 shows spectral transmittance curves of infrared cut filters in which only the infrared absorbing layers according to the first through third exemplary embodiments are respectively formed. The spectral transmittance curves of the respective exemplary embodiments reveal that the average transmittance in the visible spectrum range of 400-600 nm is 75% or greater and the cut-off wavelength $\lambda_{AT50}$ is located in the range 630-690 nm, demonstrating that the requirement for property of the infrared absorbing layer 16 is met.

A more suitable condition for the cut-off wavelength $\lambda_{RT50\%}$ of the infrared reflecting layer 14 and the cut-off wavelength $\lambda_{AT50\%}$ of the infrared absorbing layer 16 will be discussed. FIGS. 9A-9M show the spectral transmittance curves of the infrared cut filter obtained by varying the difference between $\lambda_{AT50\%}$ and $\lambda_{RT50\%}$ in the first exemplary embodiment in units of 10 nm. FIGS. 10A-10M show the spectral transmittance curves of the infrared cut filter obtained by varying the difference between $\lambda_{AT50\%}$ and $\lambda_{RT50\%}$ in the second exemplary embodiment in units of 10 nm. FIGS. 11A-11M show the spectral transmittance curves of the infrared cut filter obtained by varying the difference between $\lambda_{AT50\%}$ and $\lambda_{RT50\%}$ in the third exemplary embodiment in units of 10 nm. Referring to FIGS. 9A-9M, 10A-10M, and 11A-11M, the solid line represents the spectral transmittance curve that results when the incident angle is 0°, the broken line represents the spectral transmittance curve that results when the incident angle is 25°, and the chain line represents the spectral transmittance curve that results when the incident angle is 35°. In each of the exemplary embodiments, the difference between $\lambda_{AT50\%}$ and $\lambda_{RT50\%}$ is set by fixing $\lambda_{AT50\%}$ of the infrared absorbing layer 16 and varying the cut-off wavelength $\lambda_{RT50\%}$ of the infrared reflecting layer 14. Since the infrared reflecting layer 14 is formed of a dielectric multilayer film, variation in the transient range can be easily implemented by adjusting the film thickness or the number of layers.

Figure 9A:
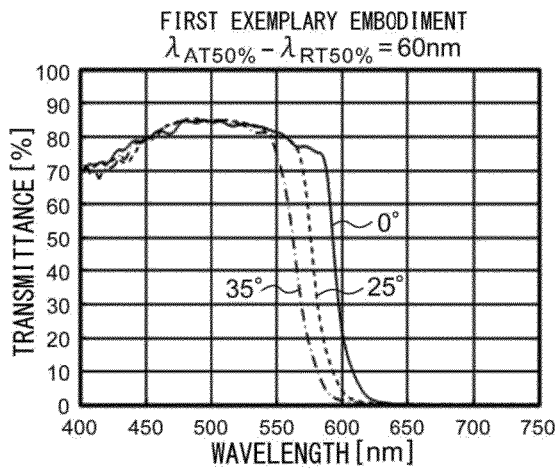
FIG. 9A shows the spectral transmittance of the infrared cut filter according to the first exemplary embodiment in which $\lambda_{AT50\%} - \lambda_{RT50\%} = 60$ nm.
Figure 9B:
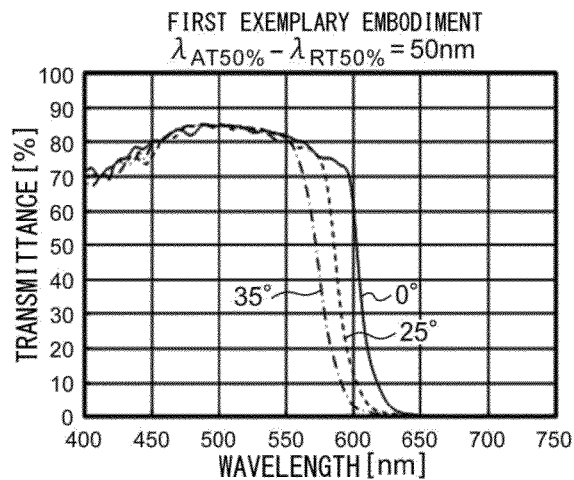
FIG. 9B shows the spectral transmittance of the infrared cut filter according to the first exemplary embodiment in which $\lambda_{AT50\%} - \lambda_{RT50\%} = 50$ nm.
Figure 9C:
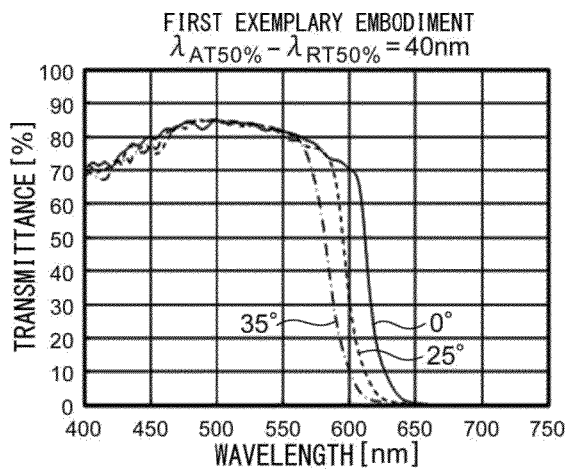
FIG. 9C shows the spectral transmittance of the infrared cut filter according to the first exemplary embodiment in which $\lambda_{AT50\%} - \lambda_{RT50\%} = 40$ nm.
Figure 9D:
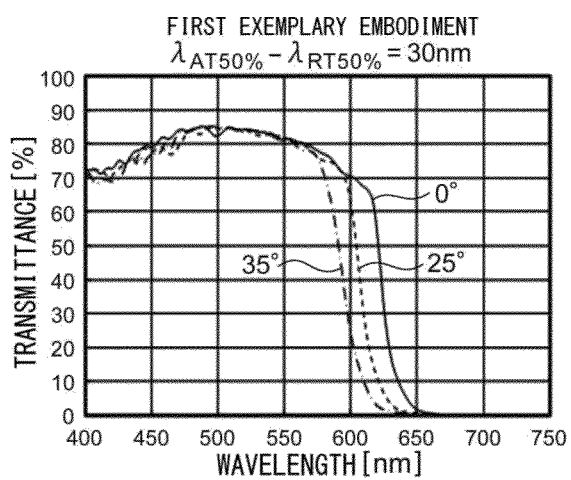
FIG. 9D shows the spectral transmittance of the infrared cut filter according to the first exemplary embodiment in which $\lambda_{AT50\%}-\lambda_{RT50\%}=30$ nm.
Figure 9E:
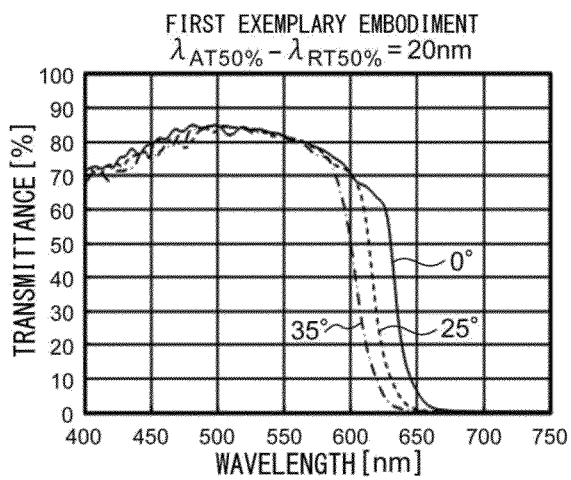
FIG. 9E shows the spectral transmittance of the infrared cut filter according to the first exemplary embodiment in which $\lambda_{AT50\%}-\lambda_{RT50\%}=20$ nm.
Figure 9F:
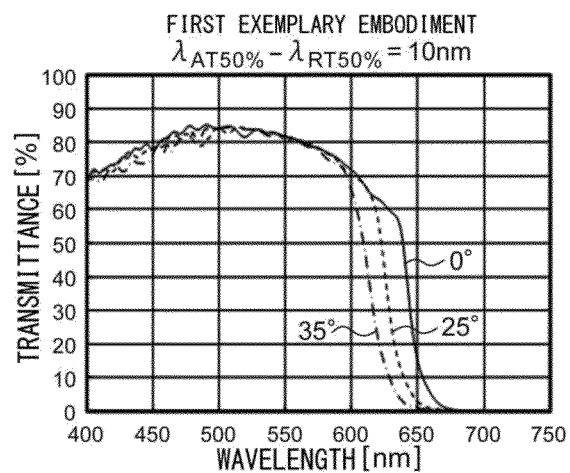
FIG. 9F shows the spectral transmittance of the infrared cut filter according to the first exemplary embodiment in which $\lambda_{AT50\%}-\lambda_{RT50\%}=10$ nm.
Figure 9G:
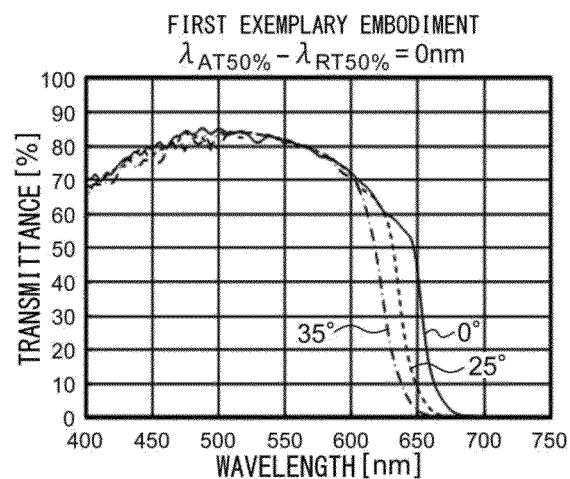
FIG. 9G shows the spectral transmittance of the infrared cut filter according to the first exemplary embodiment in which $\lambda_{AT50\%}-\lambda_{RT50\%}=0$ nm.
Figure 9H:
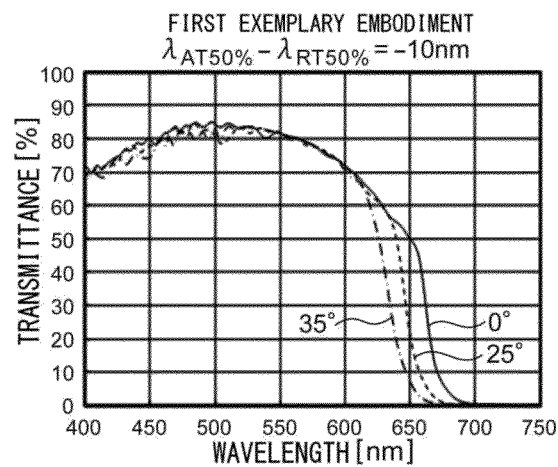
FIG. 9H shows the spectral transmittance of the infrared cut filter according to the first exemplary embodiment in which $\lambda_{AT50\%}-\lambda_{RT50\%}=-10$ nm.
Figure 9I:
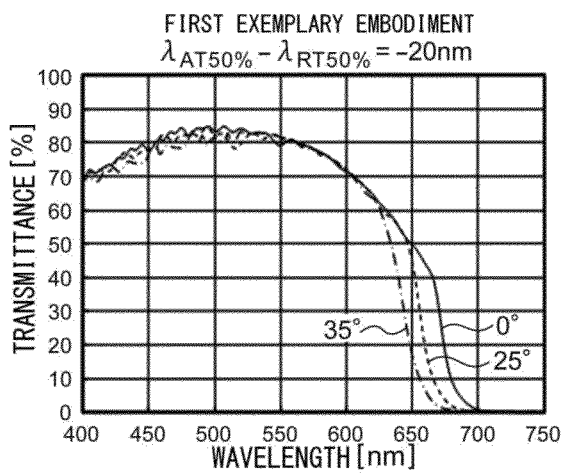
FIG. 9I shows the spectral transmittance of the infrared cut filter according to the first exemplary embodiment in which $\lambda_{AT50\%}-\lambda_{RT50\%}=-20$ nm.
Figure 9J:
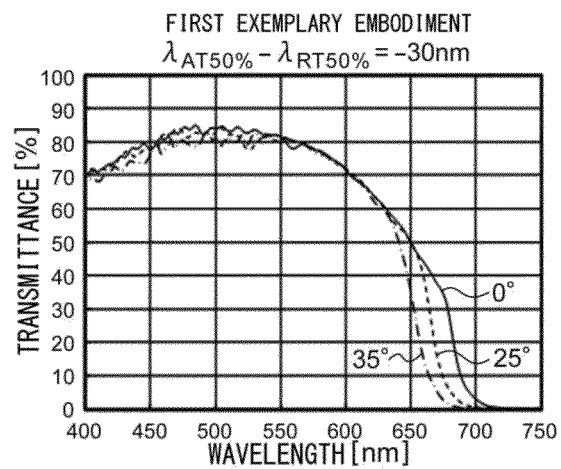
FIG. 9J shows the spectral transmittance of the infrared cut filter according to the first exemplary embodiment in which $\lambda_{AT50\%}-\lambda_{RT50\%}=-30$ nm.
Figure 9K:
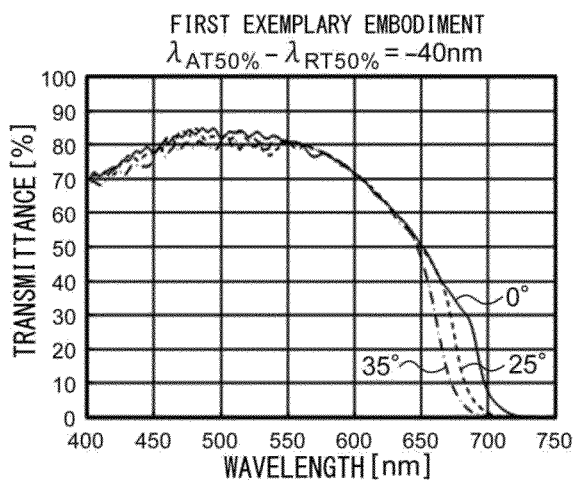
FIG. 9K shows the spectral transmittance of the infrared cut filter according to the first exemplary embodiment in which $\lambda_{AT50\%}-\lambda_{RT50\%}=-40$ nm.
Figure 9L:
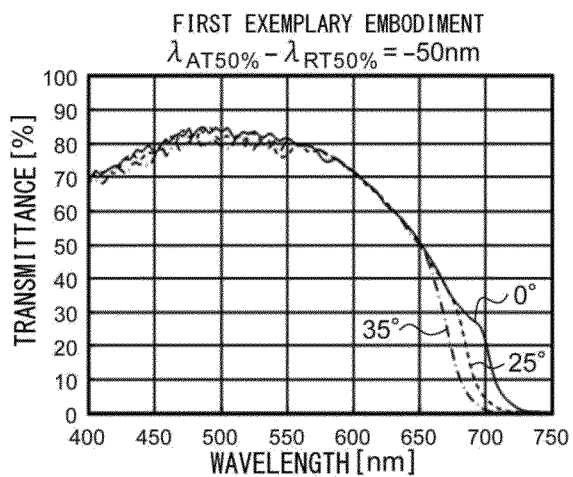
FIG. 9L shows the spectral transmittance of the infrared cut filter according to the first exemplary embodiment in which $\lambda_{AT50\%}-\lambda_{RT50\%}=-50$ nm.
Figure 9M:
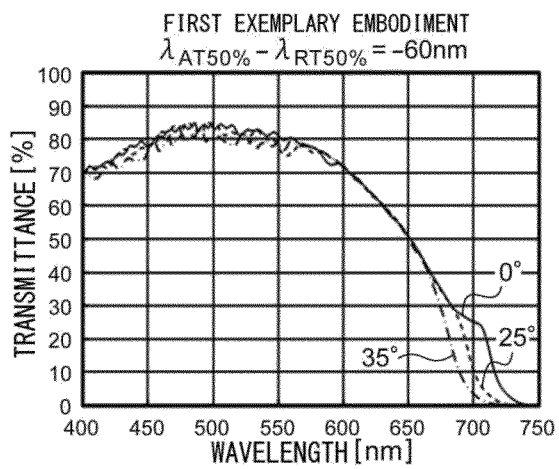
FIG. 9M shows the spectral transmittance of the infrared cut filter according to the first exemplary embodiment in which $\lambda_{AT50\%}-\lambda_{RT50\%}=-60$ nm.
Figure 10A:
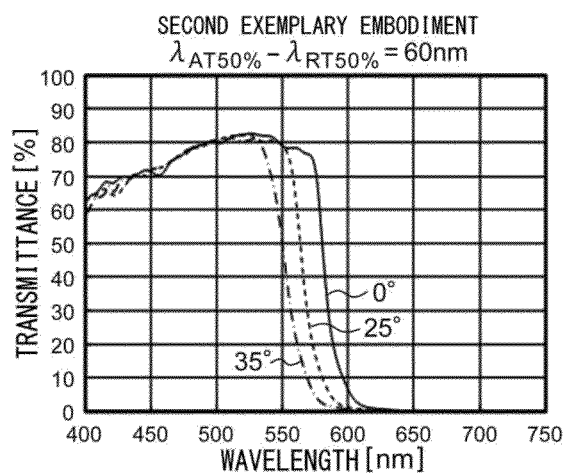
FIG. 10A shows the spectral transmittance of the infrared cut filter according to the second exemplary embodiment in which $\lambda_{AT50\%}-\lambda_{RT50\%}=60$ nm.
Figure 10B:
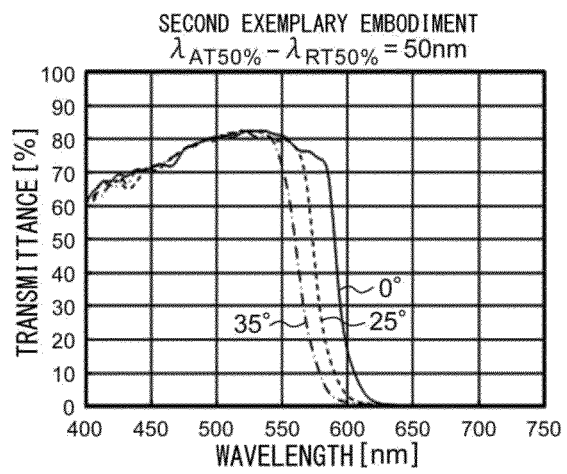
FIG. 10B shows the spectral transmittance of the infrared cut filter according to the second exemplary embodiment in which $\lambda_{AT50\%}-\lambda_{RT50\%}=50$ nm.
Figure 10C:
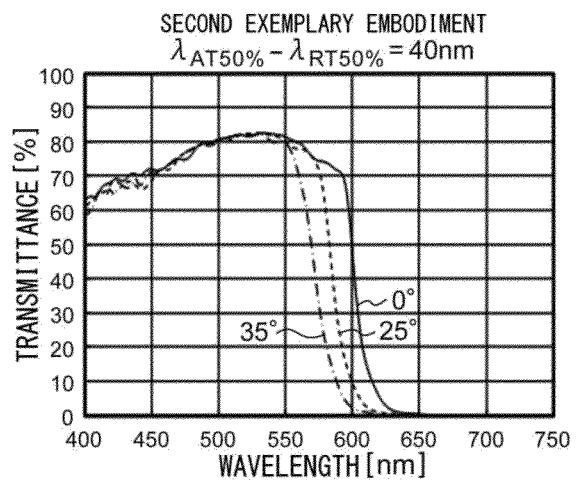
FIG. 10C shows the spectral transmittance of the infrared cut filter according to the second exemplary embodiment in which $\lambda_{AT50\%}-\lambda_{RT50\%}=40$ nm.
Figure 10D:
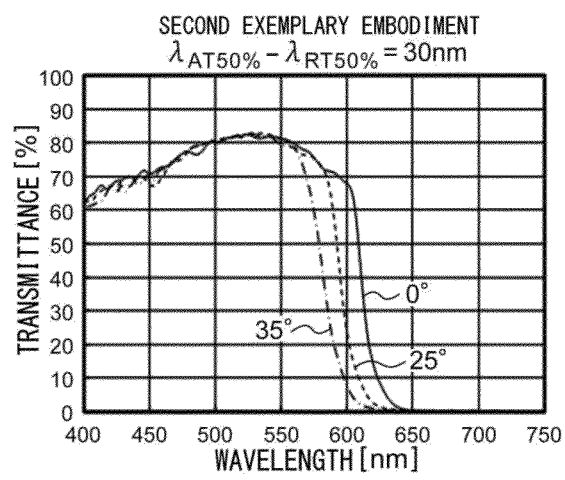
FIG. 10D shows the spectral transmittance of the infrared cut filter according to the second exemplary embodiment in which $\lambda_{AT50\%}-\lambda_{RT50\%}=30$ nm.
Figure 10E:
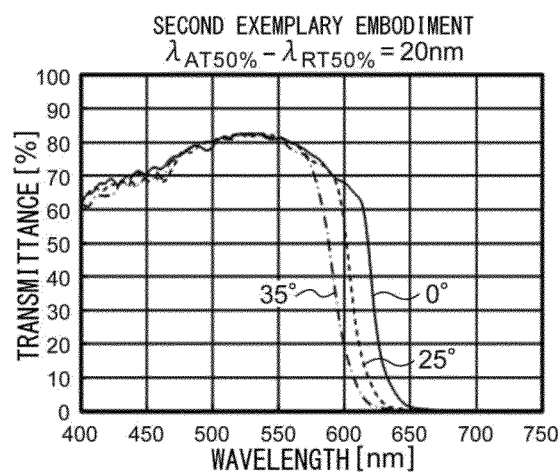
FIG. 10E shows the spectral transmittance of the infrared cut filter according to the second exemplary embodiment in which $\lambda_{AT50\%}-\lambda_{RT50\%}=20$ nm.
Figure 10F:
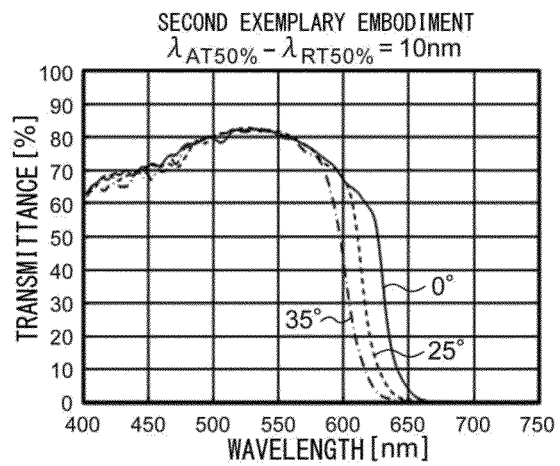
FIG. 10F shows the spectral transmittance of the infrared cut filter according to the second exemplary embodiment in which $\lambda_{AT50\%}-\lambda_{RT50\%}=10$ nm.
Figure 10G:
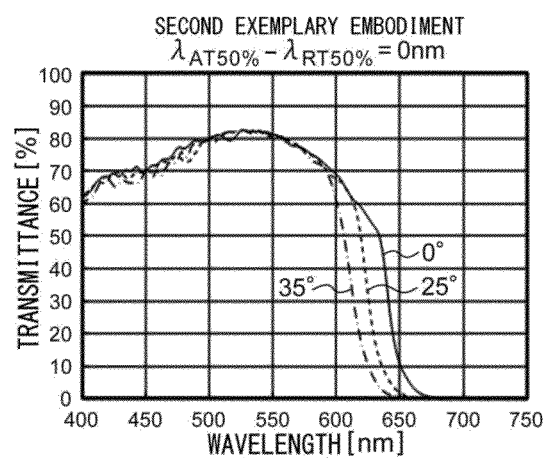
FIG. 10G shows the spectral transmittance of the infrared cut filter according to the second exemplary embodiment in which $\lambda_{AT50\%}-\lambda_{RT50\%}=0$ nm.
Figure 10H:
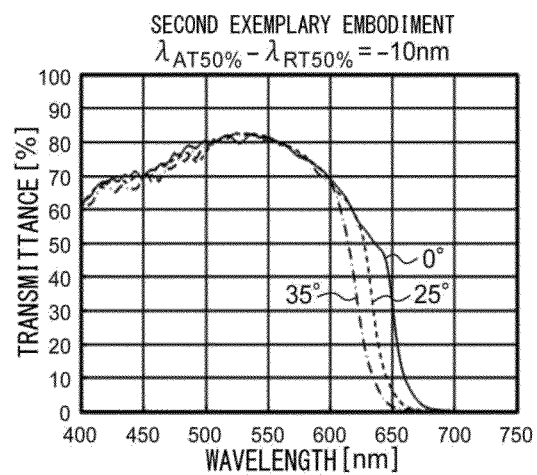
FIG. 10H shows the spectral transmittance of the infrared cut filter according to the second exemplary embodiment in which $\lambda_{AT50\%}-\lambda_{RT50\%}=-10$ nm.
Figure 10I:
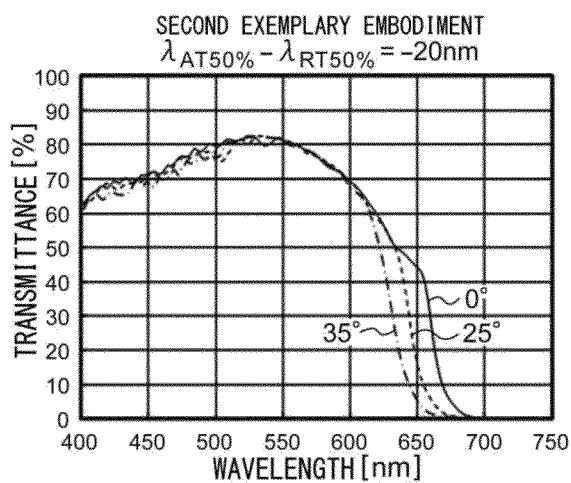
FIG. 10I shows the spectral transmittance of the infrared cut filter according to the second exemplary embodiment in which $\lambda_{AT50\%}-\lambda_{RT50\%}=-20$ nm.
Figure 10J:
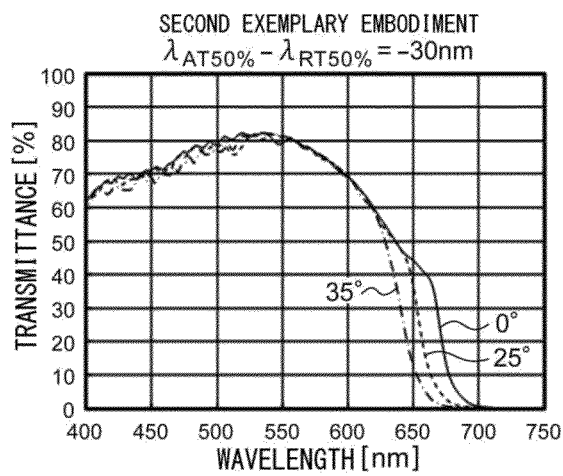
FIG. 10J shows the spectral transmittance of the infrared cut filter according to the second exemplary embodiment in which $\lambda_{AT50\%}-\lambda_{RT50\%}=-30$ nm.
Figure 10K:
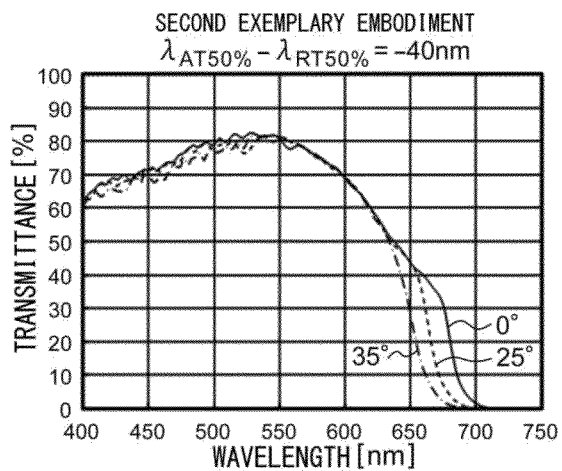
FIG. 10K shows the spectral transmittance of the infrared cut filter according to the second exemplary embodiment in which $\lambda_{AT50\%}-\lambda_{RT50\%}=-40$ nm.
Figure 10L:
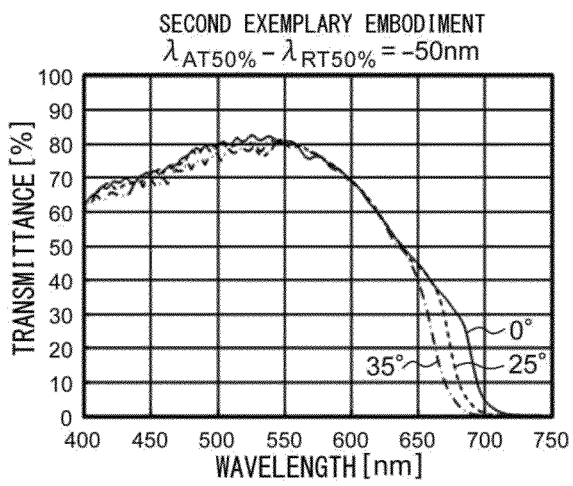
FIG. 10L shows the spectral transmittance of the infrared cut filter according to the second exemplary embodiment in which $\lambda_{AT50\%}-\lambda_{RT50\%}=-50$ nm.
Figure 10M:
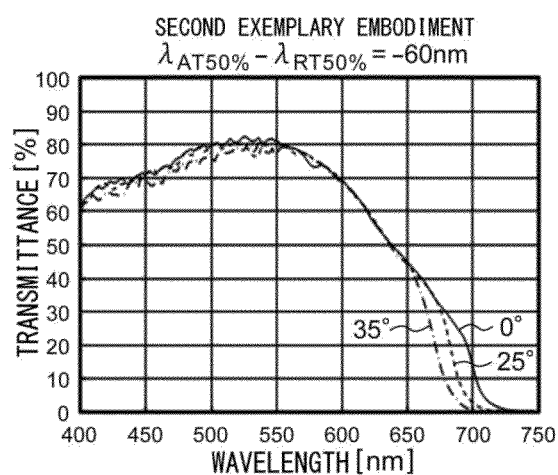
FIG. 10M shows the spectral transmittance of the infrared cut filter according to the second exemplary embodiment in which $\lambda AT50\%-\lambda_{RT50\%}=-60$ nm.
Figure 11A:
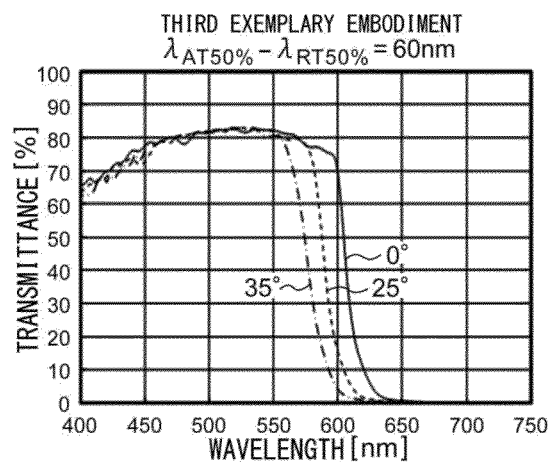
FIG. 11A shows the spectral transmittance of the infrared cut filter according to the third exemplary embodiment in which $\lambda_{AT50\%}-\lambda_{RT50\%}=60$ nm.
Figure 11B:
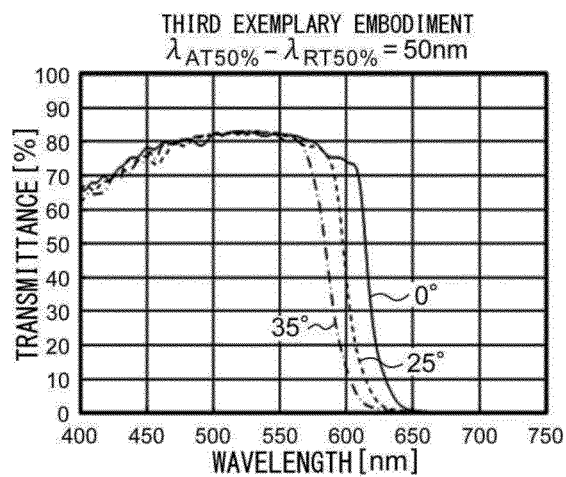
FIG. 11B shows the spectral transmittance of the infrared cut filter according to the third exemplary embodiment in which $\lambda_{AT50\%}-\lambda_{RT50\%}=50$ nm.
Figure 11C:
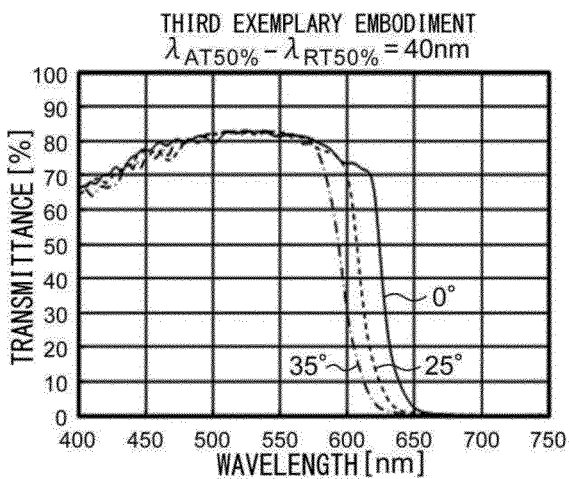
FIG. 11C shows the spectral transmittance of the infrared cut filter according to the third exemplary embodiment in which $\lambda_{AT50\%}-\lambda_{RT50\%}=40$ nm.
Figure 11D:
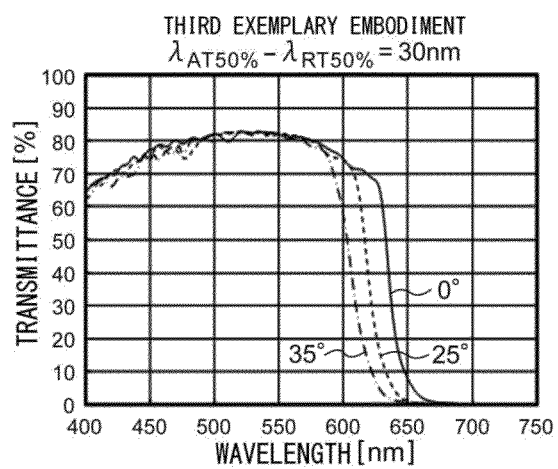
FIG. 11D shows the spectral transmittance of the infrared cut filter according to the third exemplary embodiment in which $\lambda_{AT50\%}-\lambda_{RT50\%}=30$ nm.
Figure 11E:
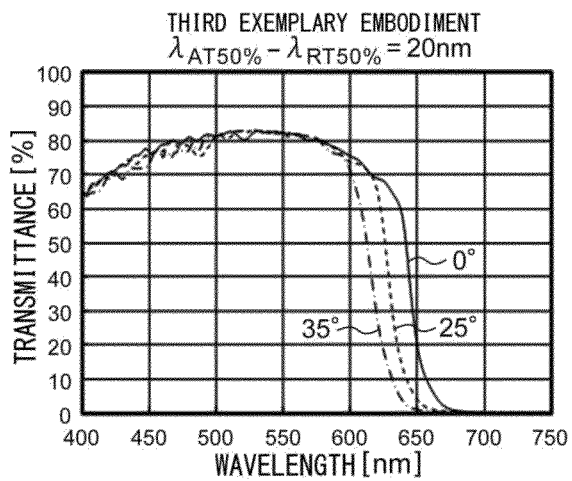
FIG. 11E shows the spectral transmittance of the infrared cut filter according to the third exemplary embodiment in which $\lambda_{AT50\%}-\lambda_{RT50\%}=20$ nm.
Figure 11F:
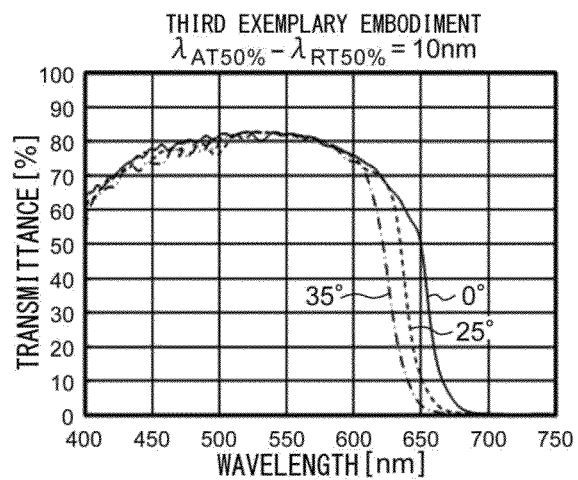
FIG. 11F shows the spectral transmittance of the infrared cut filter according to the third exemplary embodiment in which $\lambda_{AT50\%}-\lambda_{RT50\%}=10$ nm.
Figure 11G:
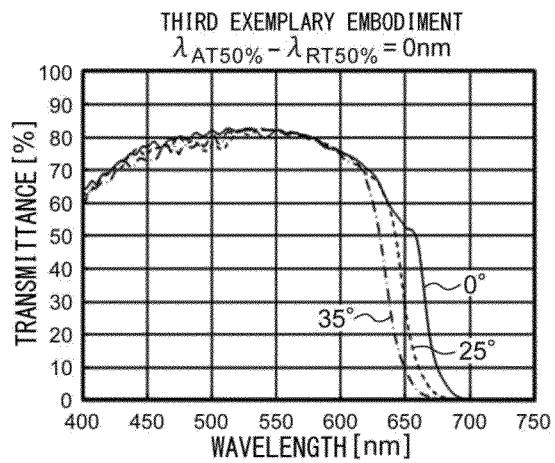
FIG. 11G shows the spectral transmittance of the infrared cut filter according to the third exemplary embodiment in which $\lambda_{AT50\%}-\lambda_{RT50\%}=0$ nm.
Figure 11H:
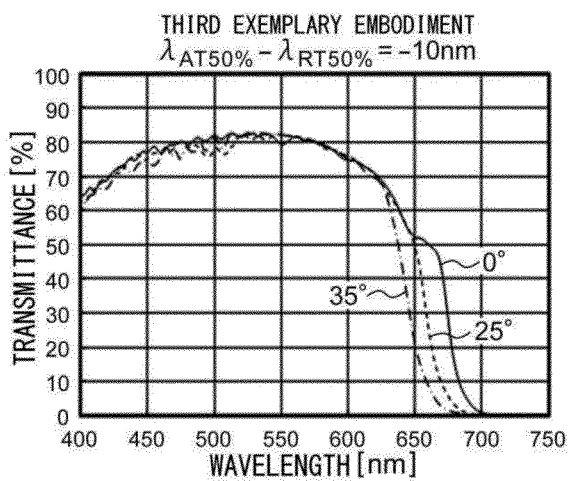
FIG. 11H shows the spectral transmittance of the infrared cut filter according to the third exemplary embodiment in which $\lambda_{AT50\%}-\lambda_{RT50\%}=-10$ nm.
Figure 11I:
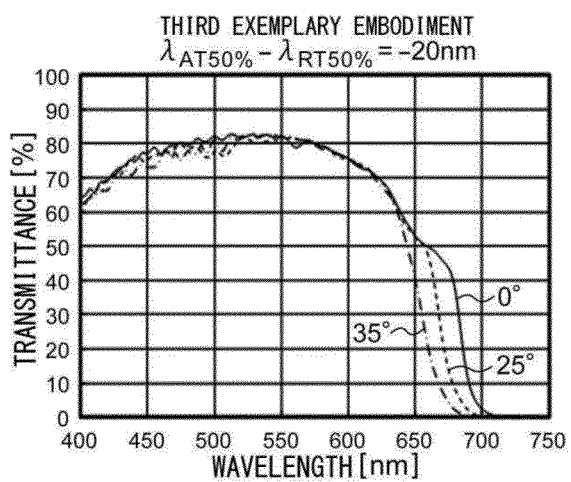
FIG. 11I shows the spectral transmittance of the infrared cut filter according to the third exemplary embodiment in which $\lambda_{AT50\%}-\lambda_{RT50\%}=-20$ nm.
Figure 11J:
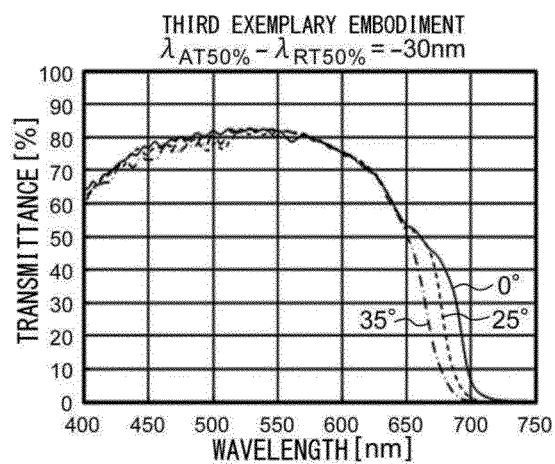
FIG. 11J shows the spectral transmittance of the infrared cut filter according to the third exemplary embodiment in which $\lambda_{AT50\%}-\lambda_{RT50\%}=-30$ nm.
Figure 11K:
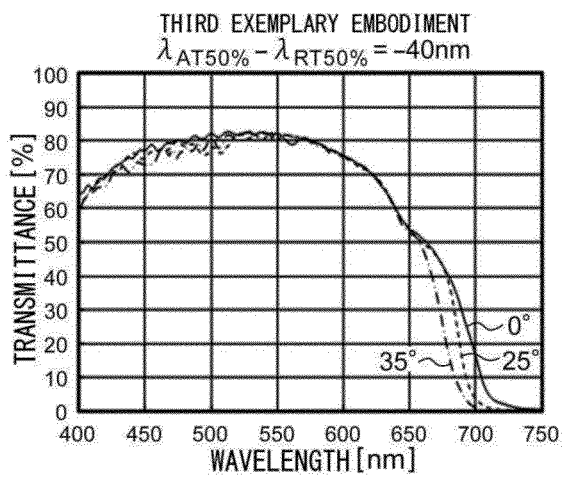
FIG. 11K shows the spectral transmittance of the infrared cut filter according to the third exemplary embodiment in which $\lambda_{AT50\%}-\lambda_{RT50\%}=-40$ nm.
Figure 11L:
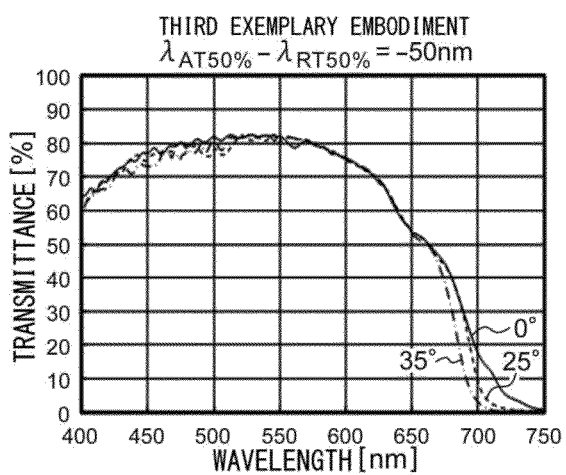
FIG. 11L shows the spectral transmittance of the infrared cut filter according to the third exemplary embodiment in which $\lambda_{AT50\%}-\lambda_{RT50\%}=-50$ nm.
Figure 11M:
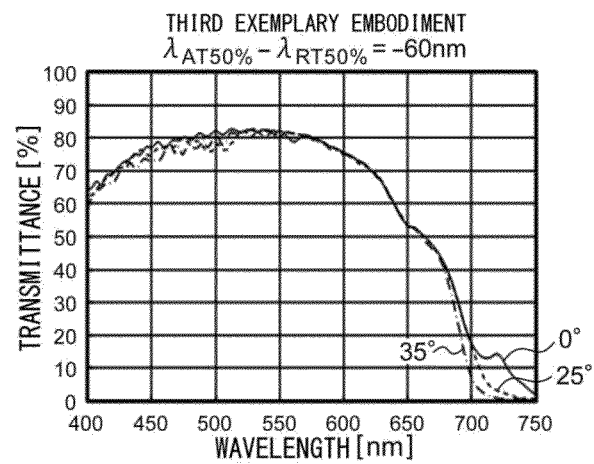
FIG. 11M shows the spectral transmittance of the infrared cut filter according to the third exemplary embodiment in which $\lambda_{AT50\%}-\lambda_{RT50\%}=-60$ nm.

FIGS. 9A, 10A, and 11A show the spectral transmittance curve of the infrared cut filter according to the first through third exemplary embodiments, respectively, in which $\lambda_{AT50\%}-\lambda_{RT50\%}=60$ nm, i.e. $\lambda_{AT50\%}$ is longer than $\lambda_{RT50\%}$ by 60 nm. FIGS. 9B, 10B, and 11B show the spectral transmittance curve of the infrared cut filter according to the first through third exemplary embodiments, respectively, in which $\lambda_{AT50\%}-\lambda_{RT50\%}=50$ nm, i.e. $\lambda_{AT50\%}$ is longer than $\lambda_{RT50\%}$ by 50 nm. FIGS. 9C, 10C, and 11C show the spectral transmittance curve of the infrared cut filter according to the first through third exemplary embodiments, respectively, in which $\lambda_{AT50\%}-\lambda_{RT50\%}=40$ nm, i.e. $\lambda_{AT50\%}$ is longer than $\lambda_{RT50\%}$ by 40 nm. FIGS. 9D, 10D, and 11D show the spectral transmittance curve of the infrared cut filter according to the first through third exemplary embodiments, respectively, in which $\lambda_{AT50\%}-\lambda_{RT50\%}=30$ nm, i.e. $\lambda_{AT50\%}$ is longer than $\lambda_{RT50\%}$ by 30 nm. FIGS. 9E, 10E, and 11E show the spectral transmittance curve of the infrared cut filter according to the first through third exemplary embodiments, respectively, in which $\lambda_{AT50\%}-\lambda_{RT50\%}=20$ nm, i.e. $\lambda_{AT50\%}$ is longer than $\lambda_{RT50\%}$ by 20 nm. FIGS. 9F, 10F, and 11F show the spectral transmittance curve of the infrared cut filter according to the first through third exemplary embodiments, respectively, in which $\lambda_{AT50\%}-\lambda_{RT50\%}=10$ nm, i.e. $\lambda_{AT50\%}$ is longer than $\lambda_{RT50\%}$ by 10 nm. FIGS. 9G, 10G, and 11G show the spectral transmittance curve of the infrared cut filter according to the first through third exemplary embodiments, respectively, in which $\lambda_{AT50\%}-\lambda_{RT50\%}=0$ nm, i.e. $\lambda_{AT50\%}$ is equal to $\lambda_{RT50\%}$. FIGS. 9H, 10H, and 11H show the spectral transmittance curve of the infrared cut filter according to the first through third exemplary embodiments, respectively, in which $\lambda_{AT50\%}-\lambda_{RT50\%}=-10$ nm, i.e. $\lambda_{AT50\%}$ is shorter than $\lambda_{RT50\%}$ by 10 nm. FIGS. 9I, 10I, and 11I show the spectral transmittance curve of the infrared cut filter according to the first through third exemplary embodiments, respectively, in which $\lambda_{AT50\%}-\lambda_{RT50\%}=-20$ nm, i.e. $\lambda_{AT50\%}$ is shorter than $\lambda_{RT50\%}$ by 20 nm. FIGS. 9J, 10J, and 11J show the spectral transmittance curve of the infrared cut filter according to the first through third exemplary embodiments, respectively, in which $\lambda_{AT50\%}-\lambda_{RT50\%}=-30$ nm, i.e. $\lambda_{AT50\%}$ is shorter than $\lambda_{RT50\%}$ by 30 nm. FIGS. 9K, 10K, and 11K show the spectral transmittance curve of the infrared cut filter according to the first through third exemplary embodiments, respectively, in which $\lambda_{AT50\%}-\lambda_{RT50\%}=-40$ nm, i.e. $\lambda_{AT50\%}$ is shorter than $\lambda_{RT50\%}$ by 40 nm. FIGS. 9L, 10L, and 11L show the spectral transmittance curve of the infrared cut filter according to the first through third exemplary embodiments, respectively, in which $\lambda_{AT50\%}-\lambda_{RT50\%}=-50$ nm, i.e. $\lambda_{AT50\%}$ is shorter than $\lambda_{RT50\%}$ by 50 nm. FIGS. 9M, 10M, and 11M show the spectral transmittance curve of the infrared cut filter according to the first through third exemplary embodiments, respectively, in which $\lambda_{AT50\%}-\lambda_{RT50\%}=-60$ nm, i.e. $\lambda_{AT50\%}$ is shorter than $\lambda_{RT50\%}$ by 60 nm.

FIG. 12 shows primary parameters of the spectral transmittance curve of FIGS. 9A-9M (first exemplary embodiment). FIG. 13 shows primary parameters of the spectral transmittance curve of FIGS. 10A-10M (second exemplary embodiment). FIG. 14 shows primary parameters of the spectral transmittance curve of FIGS. 11A-11M (third exemplary embodiment).

For evaluating the spectral transmittance curves shown in FIGS. 9A-9M, 10A-10M, and 11A-11M, we established (1) and (2) below as the property (hereinafter, referred to as "basic property") primarily required for the infrared cut filter.

$$\text{average transmittance } T_{ave} \text{ in the wavelength 400 nm-600 nm} > 70\% \quad (1)$$

$$\lambda_{SLOPE}=|\lambda_{T50\%}-\lambda_{T2\%}|<70 \text{ nm(sharp cut-off property)} \quad (2)$$

With regard to the basic property related to the average transmittance $T_{ave}$ indicated in (1), the spectral transmittance curve shown in FIG. 10A obtained when $\lambda_{AT50\%}-\lambda_{RT50\%}=60$ nm does not fulfill the requirement. However, the spectral transmittance curves shown in FIGS. 9A-9M, 10B-10M, and 11A-11M meet the basic property of (1).

Figure 15A:
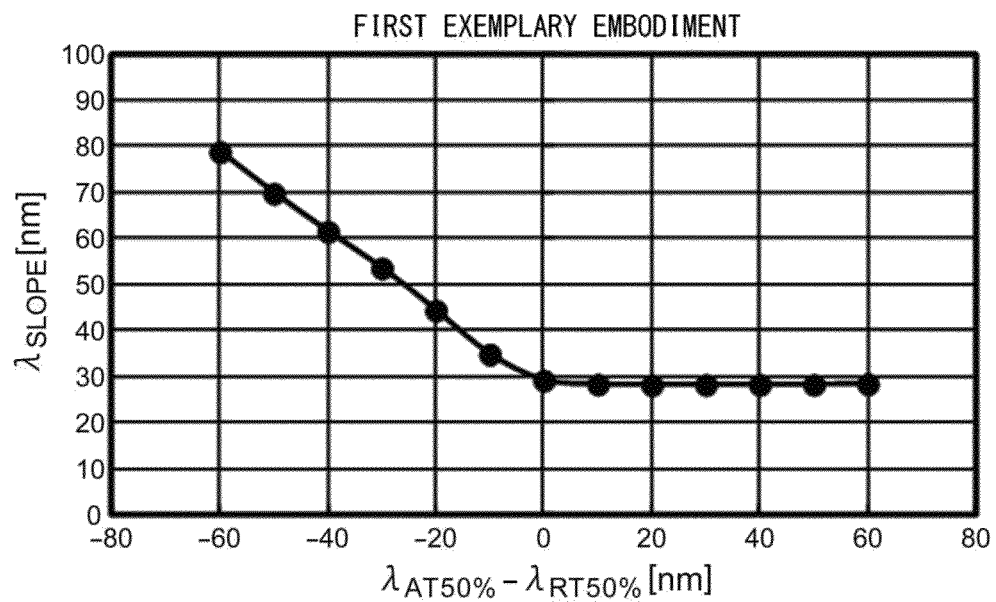
FIG. 15A shows the relationship in the first exemplary embodiment of the steepness of the transient range of the spectral transmittance curve relative to the difference between the cut-off wavelength of the infrared absorbing layer and the cut-off wavelength of the infrared reflecting layer.
Figure 16A:
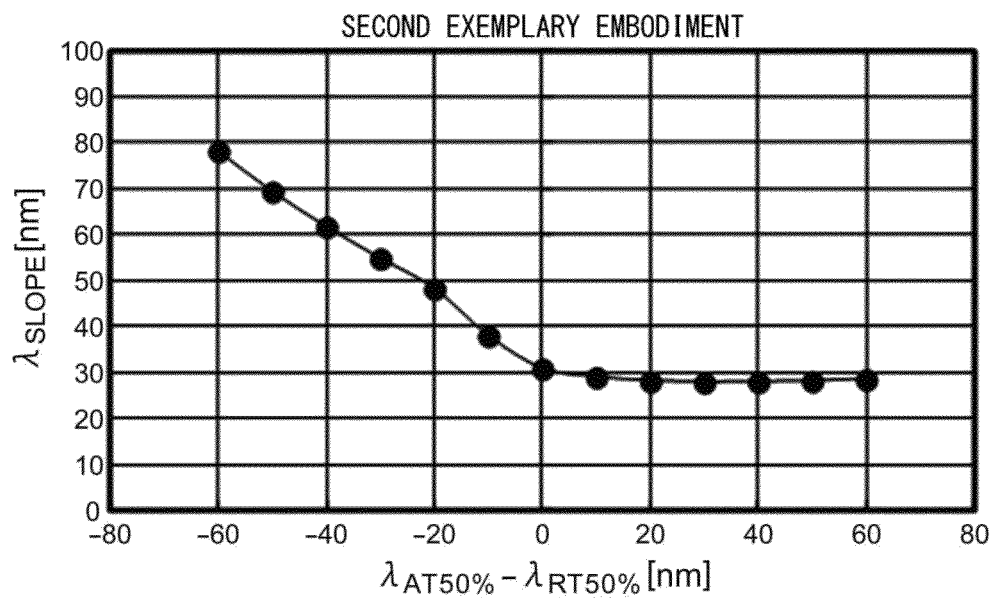
FIG. 16A shows the relationship in the second exemplary embodiment of the steepness of the transient range of the spectral transmittance curve relative to the difference between the cut-off wavelength of the infrared absorbing layer and the cut-off wavelength of the infrared reflecting layer.
Figure 17A:
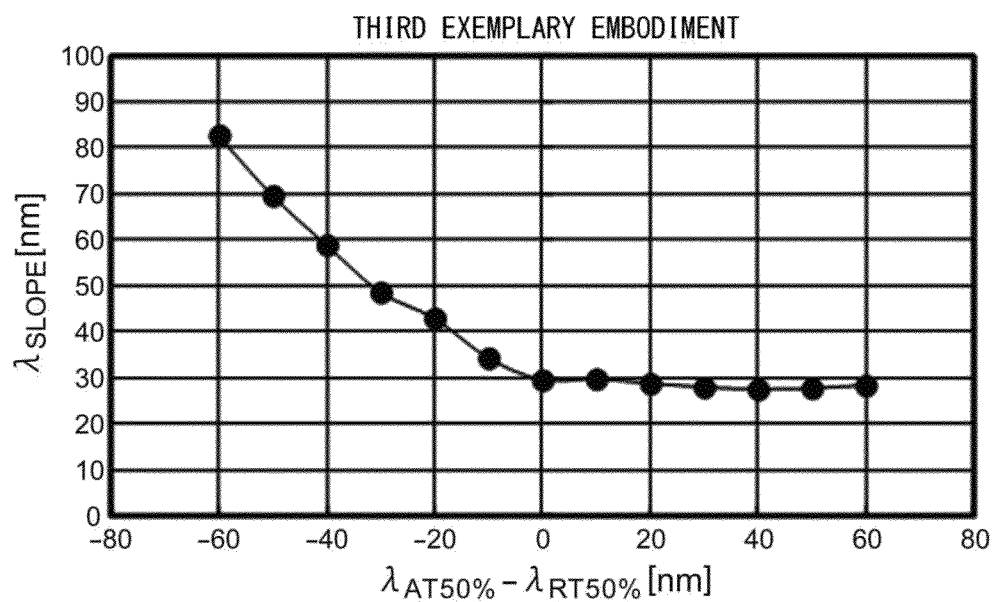
FIG. 17A shows the relationship in the third exemplary embodiment of the steepness of the transient range of the spectral transmittance curve relative to the difference between the cut-off wavelength of the infrared absorbing layer and the cut-off wavelength of the infrared reflecting layer.

FIGS. 15A, 16A, and 17A respectively show the relationship in the first through third exemplary embodiments of the steepness $\lambda_{SLOPE}=|\lambda_{T50\%}-\lambda_{T2\%}|$ of the transient range of the spectral transmittance curve relative to the difference $\lambda_{AT50\%}-\lambda_{RT50\%}$ between the cut-off wavelength $\lambda_{AT50\%}$ of the infrared absorbing layer 16 and the cut-off wavelength $\lambda_{RT50\%}$ of the infrared reflecting layer 14. As described above, the steepness (sharp cut-off property) of the spectral transmittance curve of the infrared cut filter in the transient range is preferably as small as possible, and, more specifically, less than 70 nm, as required by the condition (2) above. Thus, FIGS. 15A, 16A, and 17A show that the condition of $-50 \leq \lambda_{AT50\%}-\lambda_{RT50\%}$ is preferable.

Further, based on the fact that the spectral transmittance property of the aforementioned infrared cut filter comprised only of an infrared reflecting film varies disadvantageously depending on the incident angle, it is known that difference in color appreciated by people is based on difference in spectral transmittance in a wavelength range where the transmittance is 50% or higher. We thus established requirements (3-1)-(3-3) below as the property necessary for improvement in the dependence of the infrared shielding property on the incident angle. Given that the amount of shift in the cut-off wavelength $\lambda_{T50\%}$ obtained when the incident angle changes from 0° to 35° is denoted by $\Delta\lambda_{T50\%}$, (3-1) $\Delta\lambda_{T50\%}<25$ nm, and, more preferably, (3-2) $\Delta\lambda_{T50\%}<20$ nm, and, still more preferably, (3-3) $\Delta\lambda_{T50\%}<12.5$ nm.

It is easy for an ordinary infrared cut filter comprised only of an infrared reflecting film to meet the requirements for property (1) and (2) above. It is common, however, that $\Delta\lambda_{T50\%}$, which is defined as an indicator of dependence on incident angle to be 30 through 40 nm, or larger. The magnitude of shift in the cut-off wavelength $\lambda_{T50\%}$ is experienced as difference in color within an image.

Figure 15B:
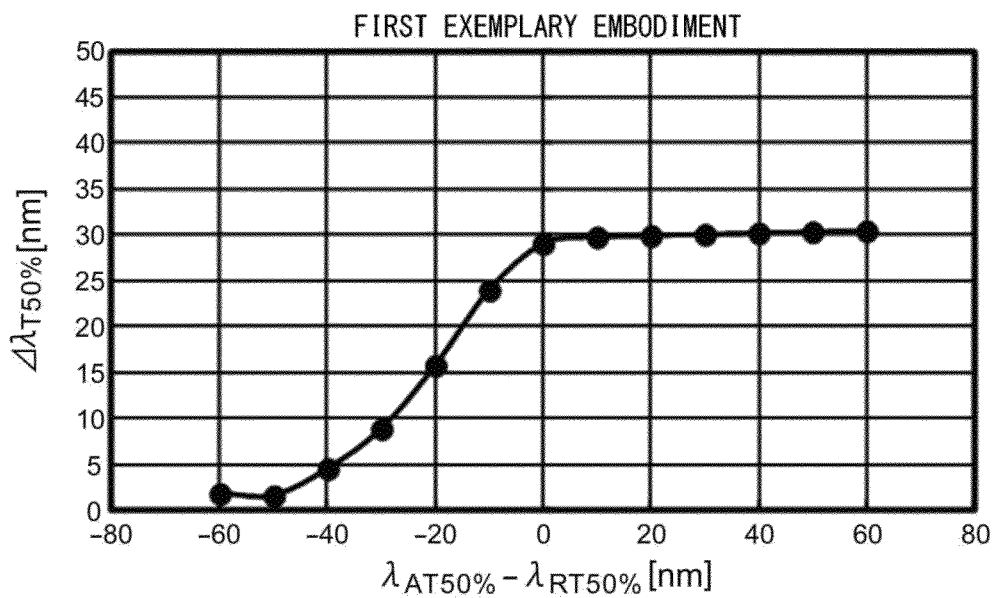
FIG. 15B shows the relationship in the first exemplary embodiment of the shift amount of the cut-off wavelength occurring when the incident angle changes from 0° to 35° relative to the difference between the cut-off wavelength of the infrared absorbing layer and the cut-off wavelength of the infrared reflecting layer.
Figure 16B:
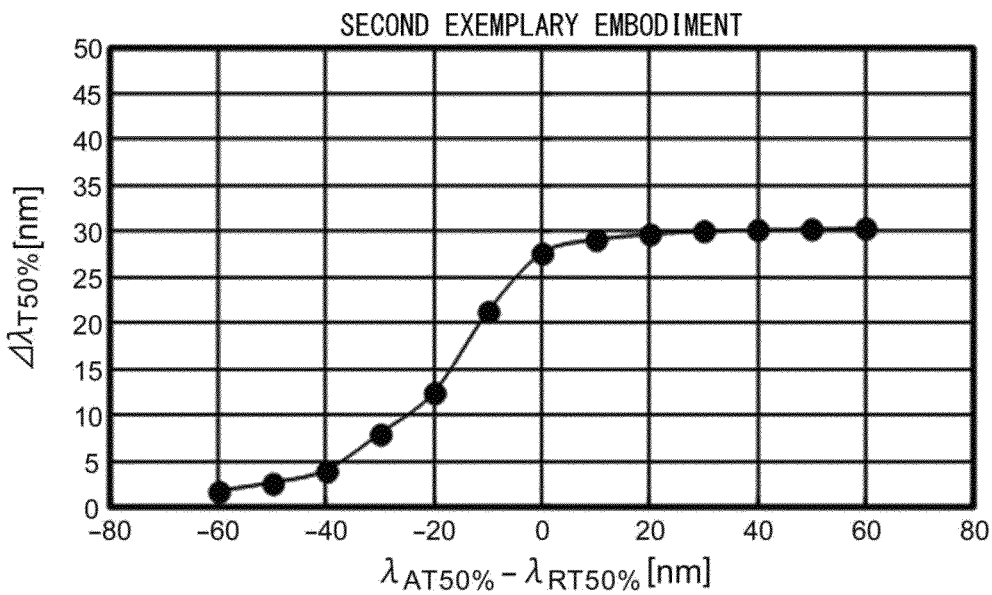
FIG. 16B shows the relationship in the second exemplary embodiment of the shift amount of the cut-off wavelength occurring when the incident angle changes from 0° to 35° relative to the difference between the cut-off wavelength of the infrared absorbing layer and the cut-off wavelength of the infrared reflecting layer.
Figure 17B:
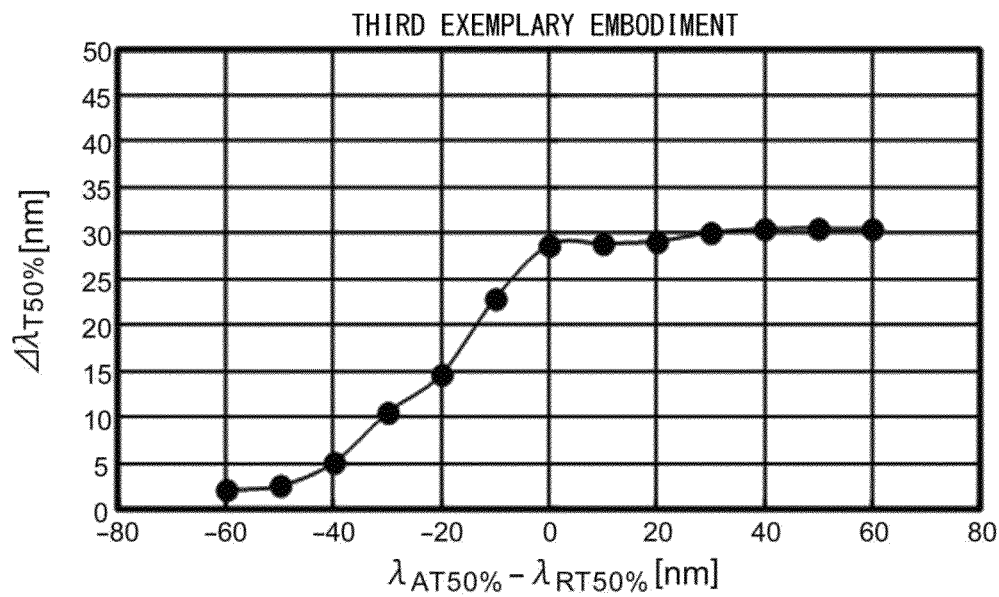
FIG. 17B shows the relationship in the third exemplary embodiment of the shift amount of the cut-off wavelength occurring when the incident angle changes from 0° to 35° relative to the difference between the cut-off wavelength of the infrared absorbing layer and the cut-off wavelength of the infrared reflecting layer.

FIGS. 15B, 16B, and 17B respectively show the relationship in the first through third embodiments of the shift amount $\Delta\lambda_{T50\%}$ of the cut-off wavelength $\lambda_{T50\%}$ occurring when the incident angle changes from 0° to 35° relative to the difference $\lambda_{AT50\%}-\lambda_{RT50\%}$ between the cut-off wavelength $\lambda_{AT50\%}$ of the infrared absorbing layer 16 and the cut-off wavelength $\lambda_{RT50\%}$ of the infrared reflecting layer 14. It is preferable that $\Delta\lambda_{T50\%}$ be less than 25 nm, and, more preferably, less than 20 nm, and, still more preferably, less than 12.5 nm, as required by requirements (3-1)-(3-3) above. Thus, FIGS. 15B, 16B, and 17B show that it is preferable that $\lambda_{AT50\%}-\lambda_{RT50\%} \leq -10$ nm, and, more preferably, $\lambda_{AT50\%}-\lambda_{RT50\%} \leq -20$ nm, and, still more preferably, $\lambda_{AT50\%}-\lambda_{RT50\%} \leq -30$ nm.

Based on the foregoing considerations, it is preferable that the difference between the cut-off wavelength $\lambda_{AT50\%}$ of the infrared absorbing layer 16 and the cut-off wavelength $\lambda_{RT50\%}$ of the infrared reflecting layer 14 meet the following condition (4).

$$-50 \text{ nm} \leq \lambda_{AT50\%}-\lambda_{RT50\%} \leq -10 \text{ nm} \quad (4)$$

Further, it is preferable that the cut-off wavelength $\lambda_{RT50\%}$ of the infrared reflecting layer 14 and the cut-off wavelength $\lambda_{AT50\%}$ of the infrared absorbing layer 16 meet the following condition (5).

$$630 \text{ nm} \leq \lambda_{RT50\%}, \lambda_{AT50\%} \leq 690 \text{ nm} \quad (5)$$

By forming the infrared reflecting layer 14 and the infrared absorbing layer 16 to meet the above requirements (4) and (5), favorable images can be obtained in which balance is achieved in factors (e.g. transmittance and color quality) contributing to image quality. It is known that difference in color appreciated by people is based on difference in spectral transmittance in a wavelength range where the transmittance is 50% or higher. The spectral transmittance curves of the infrared cut filter 10 according to the first through third exemplary embodiments reveal that the spectral transmittance curve of filters that meet the requirements (4) and (5) above substantially exhibits no changes with the change in the incident angle in a wavelength range in which the transmittance is 50% or higher. The requirements for property listed above are by way of example only and can be modified so as to adapt to the property of the imaging device.

Described above is the infrared cut filter 10 according to the embodiment. The embodiment provides the infrared cut filter 10 having favorable infrared shielding property characterized by little dependence on the incident angle, by forming the infrared reflecting layer 14 on one surface of the transparent dielectric substrate 12 and forming the infrared absorbing layer 16 on the other surface.

In the infrared cut filter 10 according to the embodiment, an ordinary glass substrate can be used as the transparent dielectric substrate 12. Since it is not necessary to use fragile glass such as fluorophosphate glass which is not easy to work (e.g. to polish), the substrate can be worked in an ordinary manner (e.g. polished or cut). As a result, the thickness of the substrate can be controlled at will. For example, a thin substrate can be produced.

The property of the infrared cut filter 10 according to the embodiment is determined by the combination of the optical property of the infrared reflecting layer 14 and the optical property of the infrared absorbing layer 16. The optical property of the infrared reflecting layer 14 can be changed easily by adjusting the layer structure of the dielectric multilayer film. Also, the optical property of the infrared absorbing layer 16 can be changed easily by adjusting the type or concentration of infrared absorbing pigment included in a matrix formed by the sol-gel method to contain silica as a main component, or adjusting the thickness of the infrared absorbing layer. If fluorophosphate glass is used in order to impart the substrate with the infrared absorbing capability, change in the infrared absorbing property requires melting of fluorophosphate glass using an furnace, cutting of fluorophosphate glass, polishing of fluorophosphate glass for the purpose of adjusting the thickness, etc. Therefore, it is not easy to change the property. Thus, the infrared cut filter 10 according to the embodiment is also excellent in that the optical property of the infrared cut filter 10 can be changed easily.

In the infrared cut filter 10 according to this embodiment, the infrared absorbing layer 16 configured by employing a matrix formed by the sol-gel method to contain silica as a main component. This can increase the hardness of the infrared absorbing layer 16 so that high abrasion resistance is achieved without forming a protective layer such as a hard coat. By forming the infrared absorbing layer 16 using a matrix in which silica is a main component, better barrier against humidity is provided and high environmental resistance is achieved.

Since the infrared cut filter 10 according to this embodiment is formed by using a matrix containing silica as a main component to form the infrared absorbing layer 16, adhesion to a glass substrate, which has affinity for silica, is improved. As a result, a priming step will not be necessary in forming the infrared absorbing layer 16 on the transparent dielectric substrate 12 so that cost is reduced.

The infrared reflecting layer 14 of the infrared cut filter 10 shown in FIG. 1 may be formed to reflect ultraviolet light. By forming the infrared cut filter 10 of a dielectric multilayer film, the ultraviolet reflecting function can be provided in the infrared cut filter 10 easily by adjusting the layer structure. The color filter provided in the imaging device may be adversely affected by ultraviolet light in that the life is shortened. Therefore, by removing ultraviolet light in the infrared reflecting layer 14 located in front of the imaging device, such an impact is avoided. By building the ultraviolet reflecting function in the infrared reflecting layer 14, ultraviolet light can be removed before reaching the infrared absorbing layer 16 formed of a resin matrix so that degradation of the infrared absorbing layer 16 can be prevented.

Figure 18:
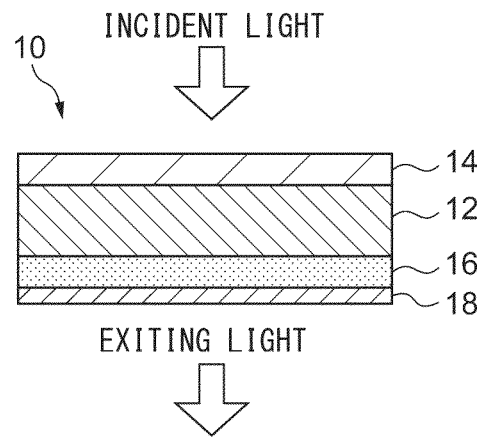
FIG. 18 shows the infrared cut filter according to another embodiment of the present invention.

FIG. 18 shows the infrared cut filter 10 according to another embodiment of the present invention. Those components of the infrared cut filter 10 shown in FIG. 18 that are identical or corresponding to components of the infrared cut filter shown in FIG. 1 are represented by the same reference symbols and description is omitted as appropriate.

The infrared cut filter 10 according to this embodiment differs from the infrared cut filter shown in FIG. 1 in that a reflection prevention layer 18 to prevent reflection of visible light is formed on the infrared absorbing layer 16. As shown in FIG. 18, the reflection prevention layer 18 is formed on the surface of the infrared absorbing layer 16 opposite to the surface facing the transparent dielectric substrate 12. In the infrared cut filter 10 according to this embodiment, light exits through the reflection prevention layer 18.

By forming the reflection prevention layer 18 on the infrared absorbing layer 16 as in the infrared cut filter 10 according to this embodiment, the visible light transmittance can be improved in the infrared cut filter 10 as a whole.

The reflection prevention layer 18 in the infrared cut filter 10 shown in FIG. 18 may be formed to prevent ultraviolet light transmittance. This prevents ultraviolet light incident, from the light incident surface, from reaching the imaging device and so prevents degradation of the color filter provided in the imaging device.

Figure 19:
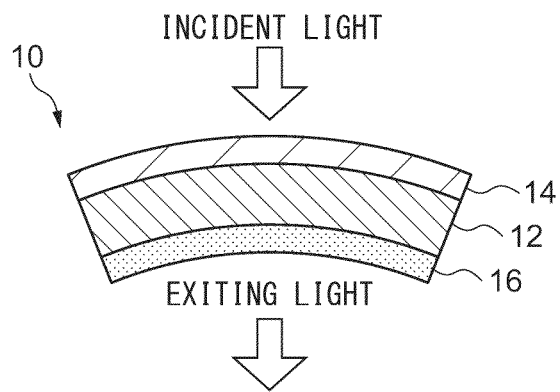
FIG. 19 shows the infrared cut filter according to still another embodiment of the present invention.

FIG. 19 shows the infrared cut filter 10 according to still another embodiment of the present invention. Those components of the infrared cut filter 10 shown in FIG. 19 that are identical or corresponding to components of the infrared cut filter shown in FIG. 1 are represented by the same reference symbols and description is omitted as appropriate.

The infrared cut filter 10 according to this embodiment differs from the infrared cut filter shown in FIG. 1 in that the infrared reflecting layer 14 is warped. The infrared reflecting layer 14 is warped such that the surface facing away from the transparent dielectric substrate 12 is convex. In association with the warp of the infrared reflecting layer 14, the transparent dielectric substrate 12 and the infrared absorbing layer 16 according to this embodiment are also warped.

As described above, when the infrared cut filter 10 is used in the imaging apparatus, the infrared cut filter 10 is mounted such that the infrared reflecting layer 14 faces the imaging lens and the infrared absorbing layer 16 faces the imaging device. However, the infrared cut filter 10 is extremely thin and small so that it is not easy to distinguish between the infrared reflecting layer 14 and the infrared absorbing layer 16. Therefore, warping of the infrared reflecting layer 14 allows the infrared reflecting layer 14 to be identified visually. By controlling the stress on the film surface when the dielectric multilayer film is deposited on the transparent dielectric substrate 12, the degree of warp of the infrared reflecting layer 14 can be adjusted without affecting the optical property.

Figure 20:
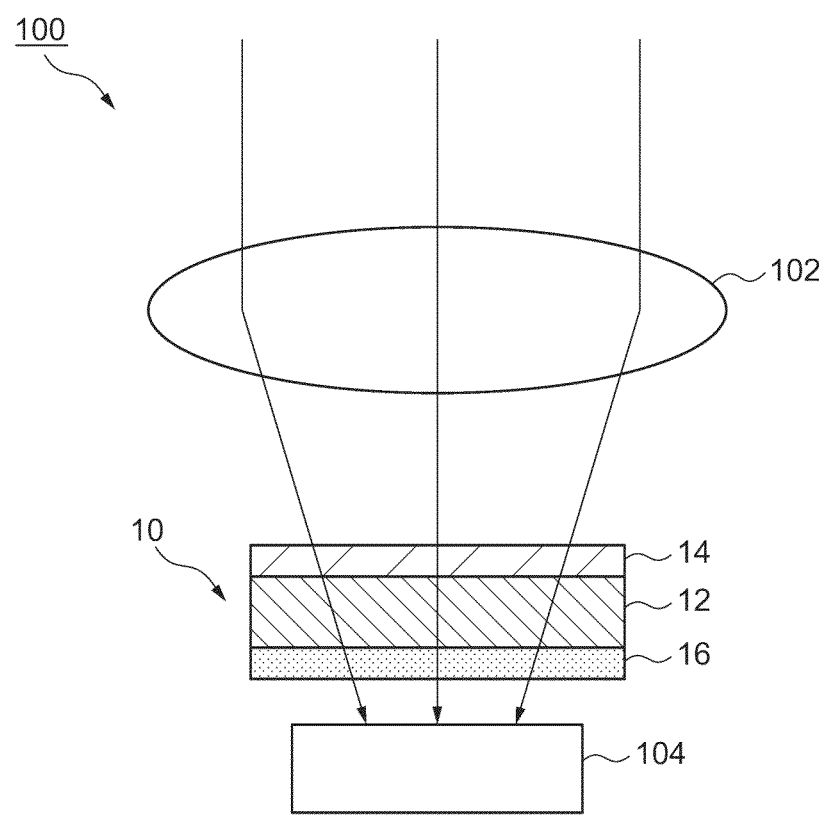
FIG. 20 shows an imaging apparatus in which the infrared cut filter according to the embodiments of the present invention is used.

FIG. 20 shows an imaging apparatus 100 in which the infrared cut filter 10 according to the embodiments of the present invention is used. As shown in FIG. 20, the imaging apparatus 100 includes an imaging lens 102, the infrared cut filter 10, and an imaging device 104. The imaging device 104 may be a semiconductor solid-state imaging device such as a CCD or a CMOS. As shown in FIG. 20, the infrared cut filter 10 is provided between the imaging lens 102 and the imaging device 104 such that the infrared reflecting layer 14 faces the imaging lens 102 and the infrared absorbing layer 16 faces the imaging device 104.

As shown in FIG. 20, light from an object is condensed by the imaging lens 102. Infrared light is removed by the infrared cut filter 10. The resultant light is incident on the imaging device 104. As shown in FIG. 20, light is incident on the infrared cut filter 10 from the imaging lens 102 at various incident angles. By using the infrared cut filter 10 according to any of the embodiments, infrared light can be suitably shielded regardless of the incident angle. Therefore, favorable images with high color reproducibility can be captured.

The embodiments as described above are used as the infrared cut filter 10 in the imaging apparatus. Alternatively, the infrared cut filter 10 according to the embodiments can be put to other uses. For example, the infrared cut filter 10 can be used as a heat shielding film for a wind shield glass or a side window of automobiles, or for architectural glass. Still alternatively, the infrared cut filter 10 can be used as an infrared cut filter for a plasma display panel (PDP).

Described above is an explanation based on an exemplary embodiment. The embodiment is intended to be illustrative only and it will be obvious to those skilled in the art that various modifications to constituting elements and processes could be developed and that such modifications are also within the scope of the present invention.

What is claimed is:

1. An infrared cut filter comprising:
   a transparent dielectric substrate;
   an infrared reflecting layer formed on one surface of the transparent dielectric substrate and configured to reflect infrared light; and
   an infrared absorbing layer formed on the other surface of the transparent dielectric substrate and configured to absorb infrared light, and formed by encapsulating infrared absorbing pigment in a matrix formed by a sol-gel method to contain silica as a main component, wherein
   the infrared reflecting layer is formed of a dielectric multilayer film,
   given that a wavelength that provides the transmittance of 50% of the infrared reflecting layer, when an incident angle is 0°, is $\lambda_{RT50\%}$ nm and the wavelength that provides the transmittance of 50% of the infrared absorbing layer, when the incident angle is 0°, is $\lambda_{AT50\%}$% nm, the infrared reflecting layer and the infrared absorbing layer are formed such that $-50$ nm$\leq \lambda_{AT50\%} - \lambda_{RT50\%} \leq -10$ nm is met, and
   given that a cut-off wavelength that provides the transmittance of 50% of the infrared cut filter, when the incident angle is 0°, is $\lambda_{T50\%}$ nm and that a shift amount of the cut-off wavelength $\lambda_{T50\%}$, when the incident angle on the infrared cut filter changes from 0° to 35°, is denoted by $\Delta\lambda_{T50\%}$, $\Delta\lambda_{T50\%} < 25$ nm, and $\lambda_{AT50\%}$ of the infrared absorbing layer and $\lambda_{RT50\%}$ of the infrared reflecting layer when the incident angle is 0° are in a range of 630 nm-690 nm.

2. The infrared cut filter according to claim 1, wherein the infrared absorbing layer includes, as a source material, a mixture of phenyltriethoxysilane and tetraethoxysilane mixed at a ratio between 50:50 and 80:20, both inclusive.

3. The infrared cut filter according to claim 1, wherein the transparent dielectric substrate is formed of glass.

4. The infrared cut filter according to claim 1, wherein the infrared reflecting layer is formed so as to reflect ultraviolet light.

5. The infrared cut filter according to claim 1, wherein a reflection prevention layer for preventing reflection of visible light is provided on the infrared absorbing layer.

6. The infrared cut filter according to claim 5, wherein the reflection prevention layer has the function of preventing transmittance of ultraviolet light.

7. The infrared cut filter according to claim 1, wherein the infrared reflecting layer is warped such that the surface opposite to the surface on the side of the transparent dielectric substrate is convex, and a warp of the infrared reflecting layer is formed by controlling a stress when the dielectric multilayer film is deposited on the transparent dielectric substrate.

8. An imaging apparatus comprising:
the infrared cut filter according to claim 1; and
an imaging device on which light transmitted by the infrared cut filter is incident, wherein
the infrared reflecting layer is warped such that the surface opposite to the surface on the side of the transparent dielectric substrate is convex,
a warp of the infrared reflecting layer is formed by controlling a stress when the dielectric multilayer film is deposited on the transparent dielectric substrate, and
the infrared absorbing layer is closer to the imaging device than is the infrared reflecting layer.

9. The infrared cut filter according to claim 1, wherein a minimal value of transmittance occurs when the wavelength is 650 nm-750 nm in a spectral transmittance curve of the infrared absorbing layer.

10. The infrared cut filter according to claim 2, wherein the infrared absorbing layer includes, as a source material, a mixture of phenyltriethoxysilane and tetraethoxysilane mixed at a ratio between 50:50 and 80:20, both inclusive, 4-6 moles of water per 1 mole of Si, and a solvent having a boiling point between 100° C.-160° C.

11. The infrared cut filter according to claim 10, wherein a thickness of the infrared absorbing layer is 0.5 μm-2.8 μm.

12. The infrared cut filter according to claim 10, wherein the infrared absorbing pigment is at least one chemical compound selected from a phthalocyanine-based compound, a cyanine-based compound, an azo-based compound, a diimonium-based compound, and a conjugated heterocycle compound.

13. The infrared cut filter according to claim 10, wherein the infrared absorbing layer includes, as the infrared absorbing pigment, a phthalocyanine-based pigment in an amount of 2-15.3 wt % and/or a cyanine-based pigment in an amount of 3.5-12.6 wt % when the mixing ratio of phenyltriethoxysilane and tetraethoxysilane is 50:50.

\* \* \* \* \*